(12) United States Patent
Sinha

(10) Patent No.: US 7,051,053 B2
(45) Date of Patent: May 23, 2006

(54) METHOD OF LAZILY REPLICATING FILES AND MONITORING LOG IN BACKUP FILE SYSTEM

(76) Inventor: Dinesh Sinha, 2075 Lincoln Hwy., Suite 207A, Edison, NJ (US) 08817

( * ) Notice: Subject to any disclaimer, the term of this patent is extended or adjusted under 35 U.S.C. 154(b) by 556 days.

(21) Appl. No.: 10/262,305

(22) Filed: Sep. 30, 2002

(65) Prior Publication Data
US 2004/0064488 A1 Apr. 1, 2004

(51) Int. Cl.
*G06F 17/30* (2006.01)

(52) U.S. Cl. .................. 707/204; 707/1; 707/103 R; 711/162

(58) Field of Classification Search ............. 707/1–2, 707/100–102, 200–206, 104.1, 103 R; 714/12–16, 714/6, 8; 711/161–163; 713/375; 715/511
See application file for complete search history.

(56) References Cited

U.S. PATENT DOCUMENTS

| | | | |
|---|---|---|---|
| 5,452,448 A * | 9/1995 | Sakuraba et al. | 707/201 |
| 5,621,795 A * | 4/1997 | Baker et al. | 380/277 |
| 5,950,198 A * | 9/1999 | Falls et al. | 707/8 |
| 6,178,427 B1 * | 1/2001 | Parker | 707/202 |
| 6,233,589 B1 * | 5/2001 | Balcha et al. | 707/203 |
| 6,243,705 B1 * | 6/2001 | Kucala | 707/10 |
| 6,247,149 B1 * | 6/2001 | Falls et al. | 714/45 |
| 6,421,741 B1 * | 7/2002 | Minyard | 713/375 |
| 6,546,500 B1 * | 4/2003 | Miyamoto | 714/6 |
| 6,623,710 B1 * | 9/2003 | Gaubert et al. | 423/8 |
| 6,625,623 B1 * | 9/2003 | Midgley et al. | 707/204 |
| 6,629,110 B1 * | 9/2003 | Cane et al. | 707/204 |
| 6,691,115 B1 * | 2/2004 | Mosher et al. | 707/10 |
| 6,714,952 B1 * | 3/2004 | Dunham et al. | 707/204 |
| 6,795,830 B1 * | 9/2004 | Banerjee et al. | 707/200 |
| 6,826,601 B1 * | 11/2004 | Jacobs et al. | 709/217 |
| 6,847,983 B1 * | 1/2005 | Somalwar et al. | 707/203 |
| 6,883,110 B1 * | 4/2005 | Goddard | 714/6 |
| 2002/0049776 A1 * | 4/2002 | Aronoff et al. | 707/200 |
| 2002/0049883 A1 * | 4/2002 | Schneider et al. | 711/100 |

(Continued)

FOREIGN PATENT DOCUMENTS

CA 2419883 * 8/2004 ......... 17/30

(Continued)

OTHER PUBLICATIONS

Hengming Zou et al. "optimization of a real-time primary backup replication service",reliable distributed systems,1998 proceedings seventeenth IEEE symposium, Oct. 1998, pp 177-185.*

(Continued)

*Primary Examiner*—Srirama Channavajjala
(74) *Attorney, Agent, or Firm*—Walter J. Tencza, Jr.

(57) ABSTRACT

A method of performing a real time optimized backup from a first computer storage device to a second or backup computer storage device, is disclosed. The method comprises two different approaches of backing up a first computer file stored on the first computer storage device to be backed up to a second computer file stored on the second computer storage device. The two approaches are instant replication and lazy replication. The method may include analyzing one or more first computer file activities and determining a set of end results achieved by the one or more first computer file activities; and executing a second computer file backup process that achieves substantially the same set of end results as the first computer file backup process, but with fewer steps.

22 Claims, 28 Drawing Sheets

U.S. PATENT DOCUMENTS

| | | | | |
|---|---|---|---|---|
| 2002/0156965 A1* | 10/2002 | Gusler et al. | ............... | 711/100 |
| 2002/0194204 A1* | 12/2002 | Mosher et al. | ............... | 707/200 |
| 2003/0182322 A1* | 9/2003 | Manley et al. | ............... | 707/201 |
| 2004/0205152 A1* | 10/2004 | Yasuda et al. | ............... | 709/217 |
| 2004/0243651 A1* | 12/2004 | Kast et al. | ................. | 707/204 |
| 2004/0267836 A1* | 12/2004 | Armangau et al. | ......... | 707/203 |
| 2005/0097260 A1* | 5/2005 | McGovern et al. | ......... | 711/100 |

FOREIGN PATENT DOCUMENTS

| | | | | |
|---|---|---|---|---|
| EP | 0550457 B1 * | 4/1997 | ................. | 11/20 |
| EP | 1001344 A2 * | 5/2000 | ................. | 11/20 |
| EP | 1139235 A2 * | 10/2001 | ................. | 17/30 |
| EP | 1365538 A1 * | 11/2003 | ................. | 12/18 |
| EP | 1452975 * | 9/2004 | ................. | 17/24 |
| WO | WO 00/45303 * | 8/2000 | ................. | 17/30 |
| WO | WO 00/67119 * | 11/2000 | ................. | 9/445 |
| WO | WO 01/52116 A1 * | 7/2001 | ................. | 17/30 |
| WO | WO 02/29573 A2 * | 4/2002 | ................. | 11/14 |

OTHER PUBLICATIONS

Rexford, J et al. "window-consistent replication for real-time applications", real-time operating systems, and softwae, 1994 proceedings, 11th IEEE workshop, May 1994, pp 107-111.*

William J Bolosky et al. "feasibility of a serverless distributed file system deployed on an existing set of desktop PCs", 2000 ACM, 10 pages.*

Puneet Kumar et al. "log-based directory resolution in the coda file system", 15 pages.*

Rivka Ladin et al. "Lazy replication: exploiting the semantics of distributed services", ACM 1990, pp 43-57.*

Germano Caronni et al. "Establishing trust in distributed storage providers", proceedings of the third international conference on peer—peer computing, IEEE 2003, 6 pages.*

Barbara Liskov et al. "replication in the Harp file system", Proceedings of the thirteenth ACM symposium on operating systems principles, 1991, pp 226-238.*

* cited by examiner

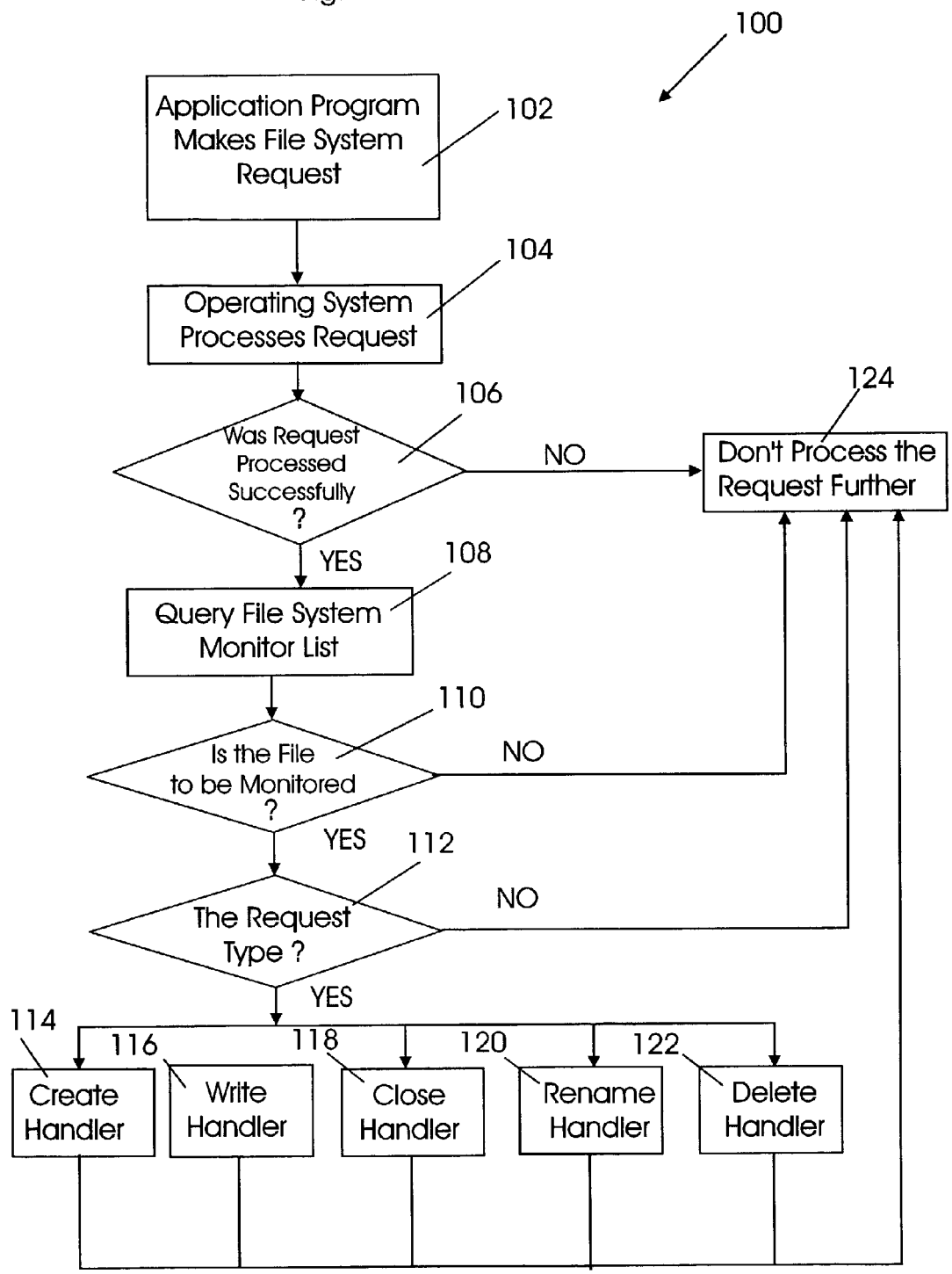

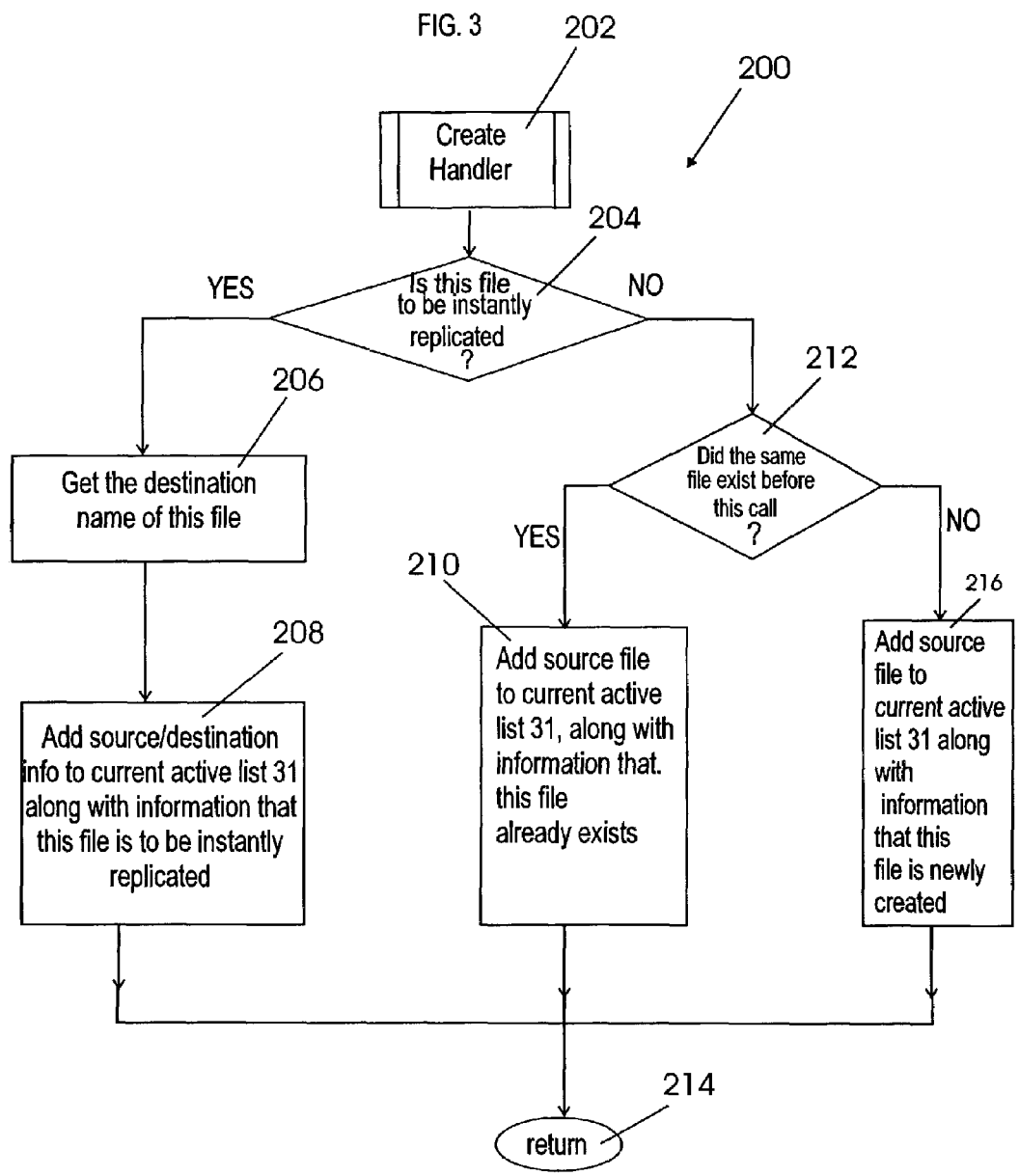

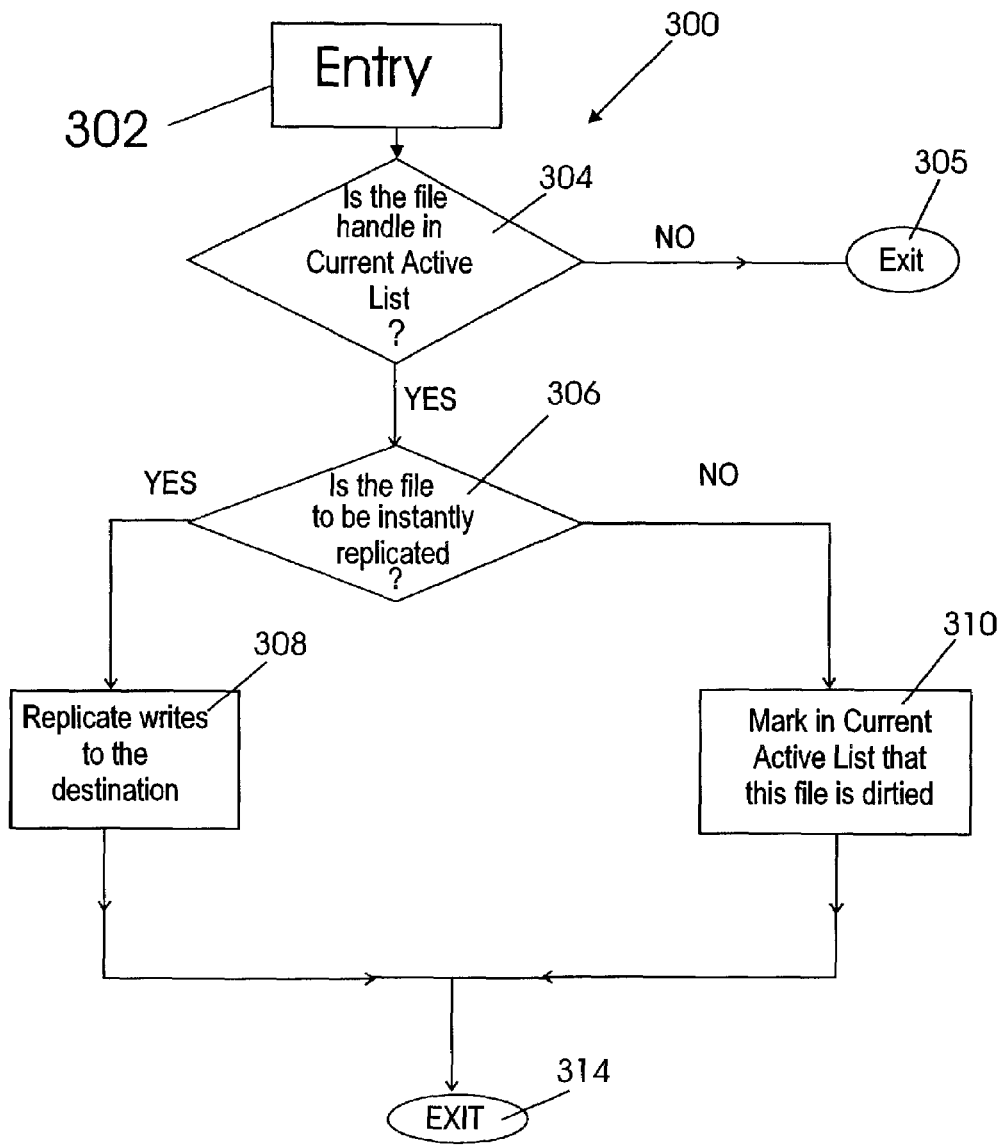

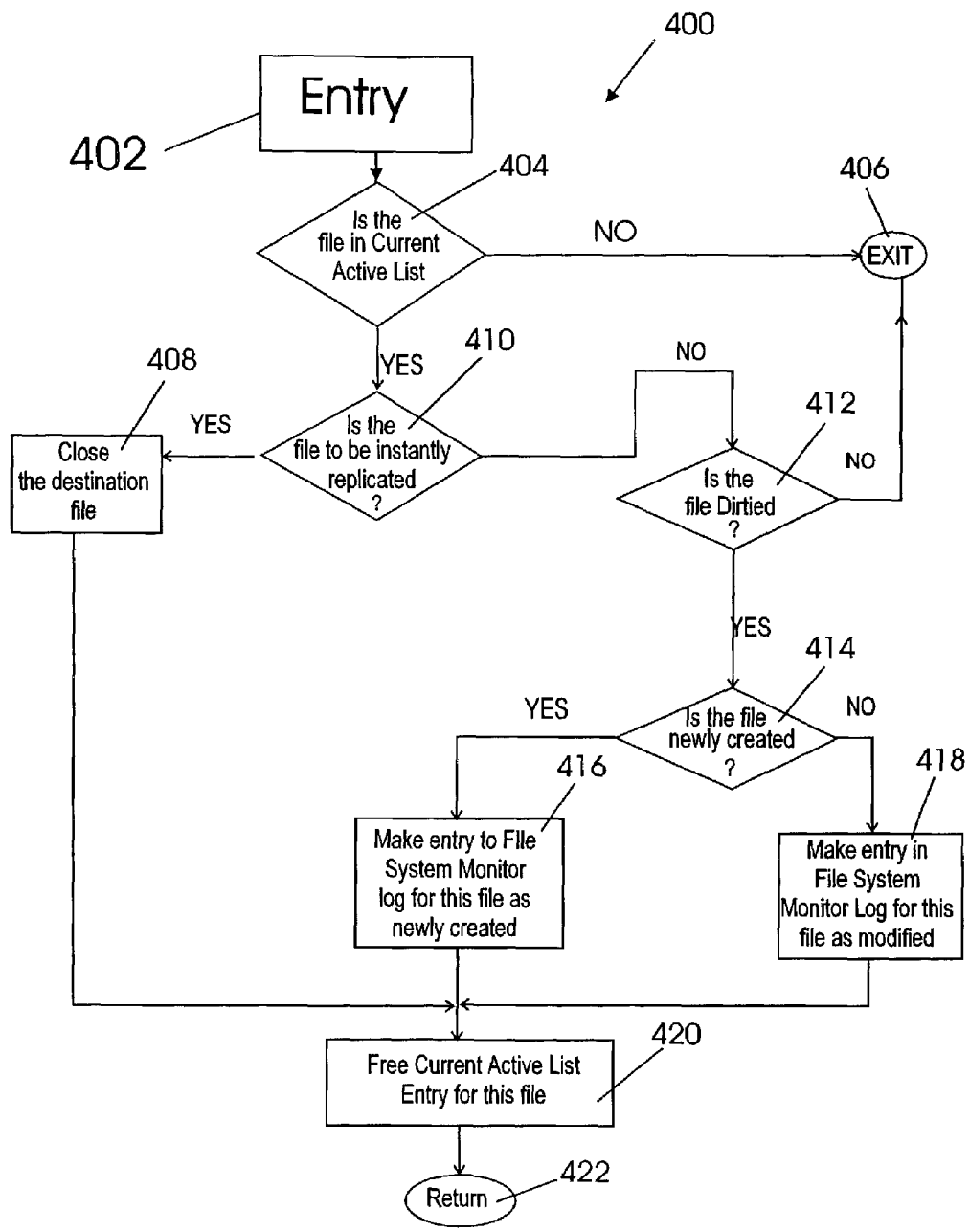

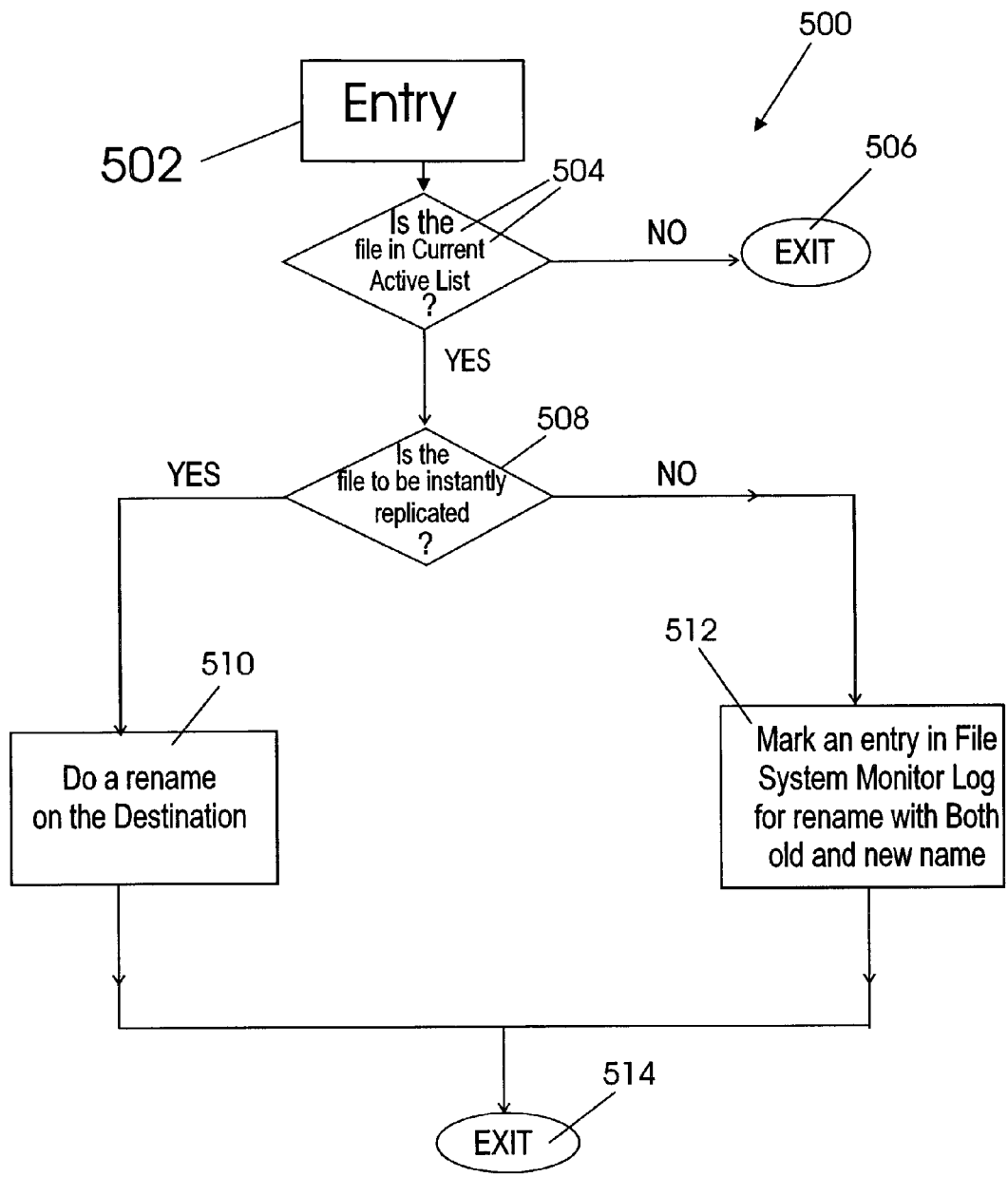

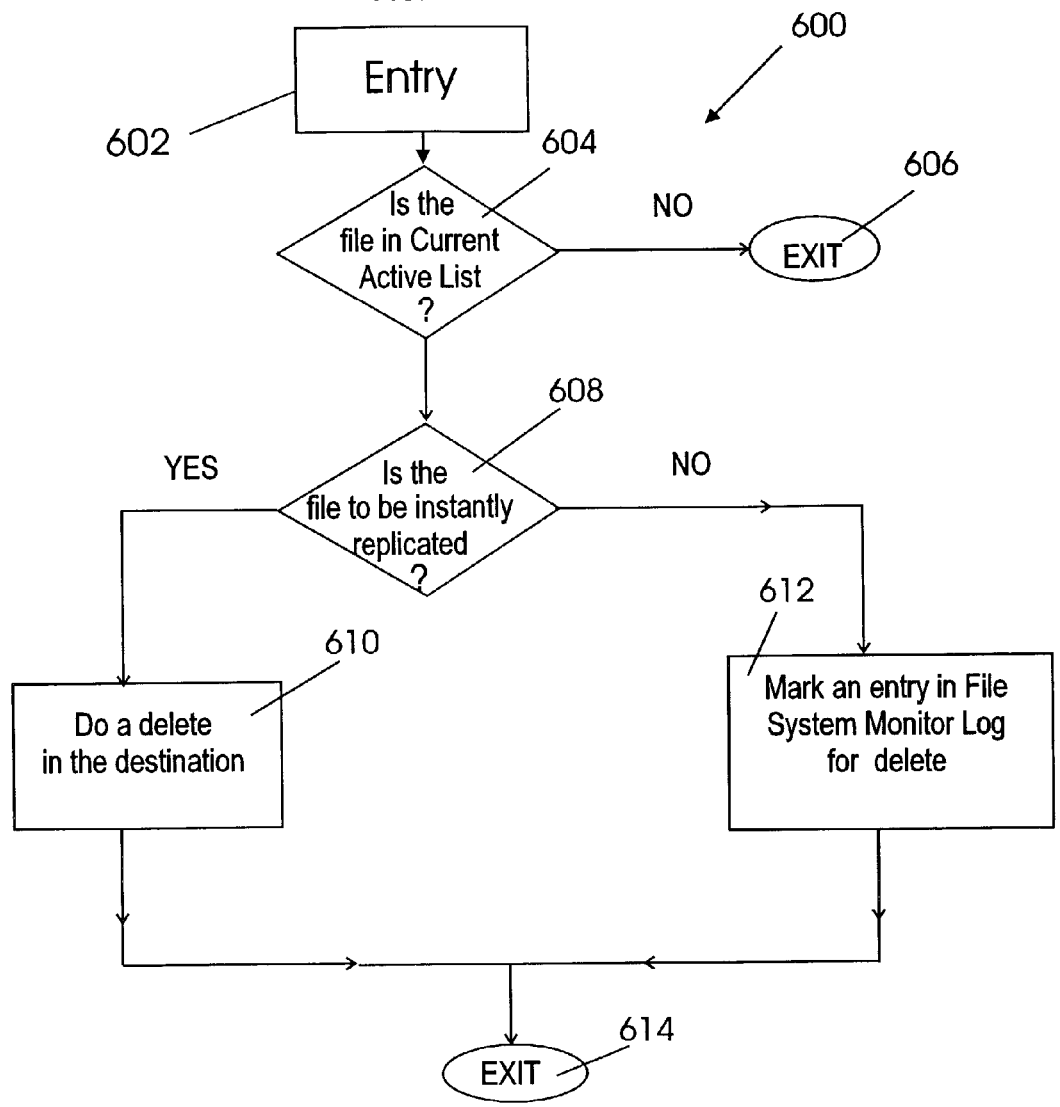

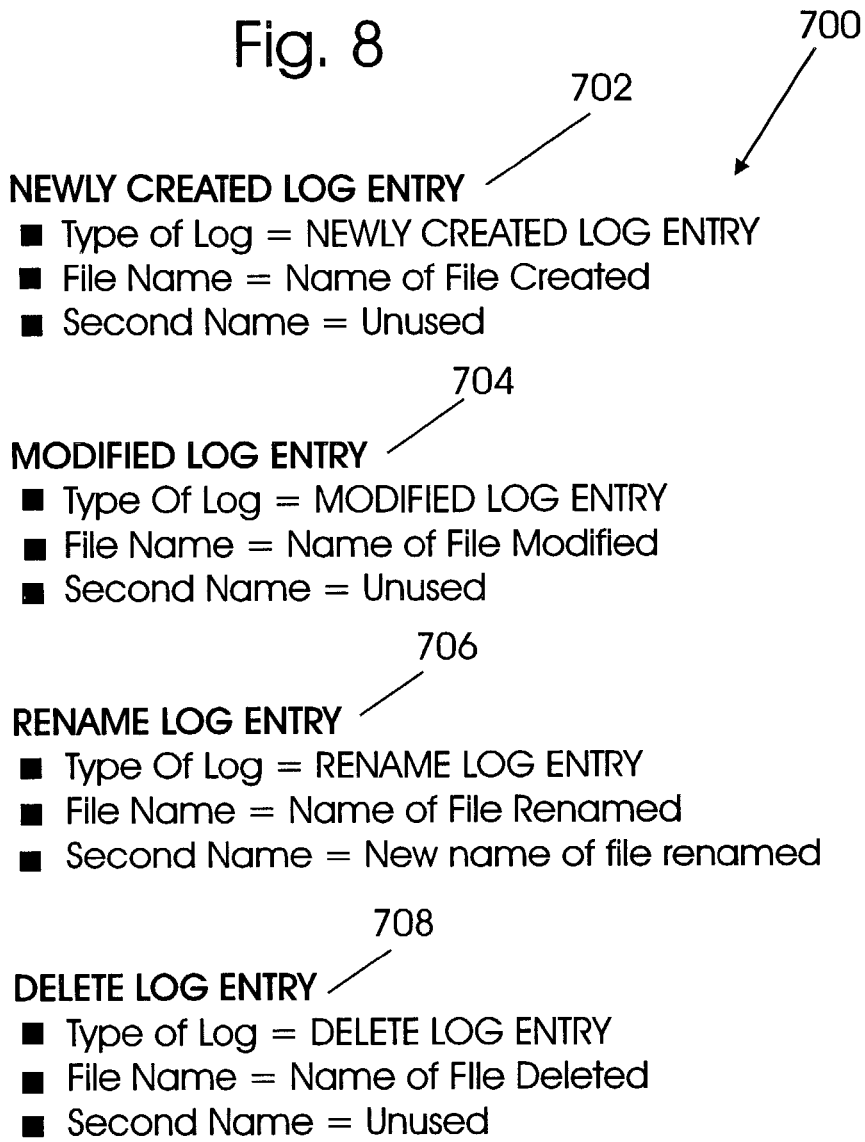

Fig. 8

NEWLY CREATED LOG ENTRY
- Type of Log = NEWLY CREATED LOG ENTRY
- File Name = Name of File Created
- Second Name = Unused

MODIFIED LOG ENTRY
- Type Of Log = MODIFIED LOG ENTRY
- File Name = Name of File Modified
- Second Name = Unused

RENAME LOG ENTRY
- Type Of Log = RENAME LOG ENTRY
- File Name = Name of File Renamed
- Second Name = New name of file renamed

DELETE LOG ENTRY
- Type of Log = DELETE LOG ENTRY
- File Name = Name of File Deleted
- Second Name = Unused

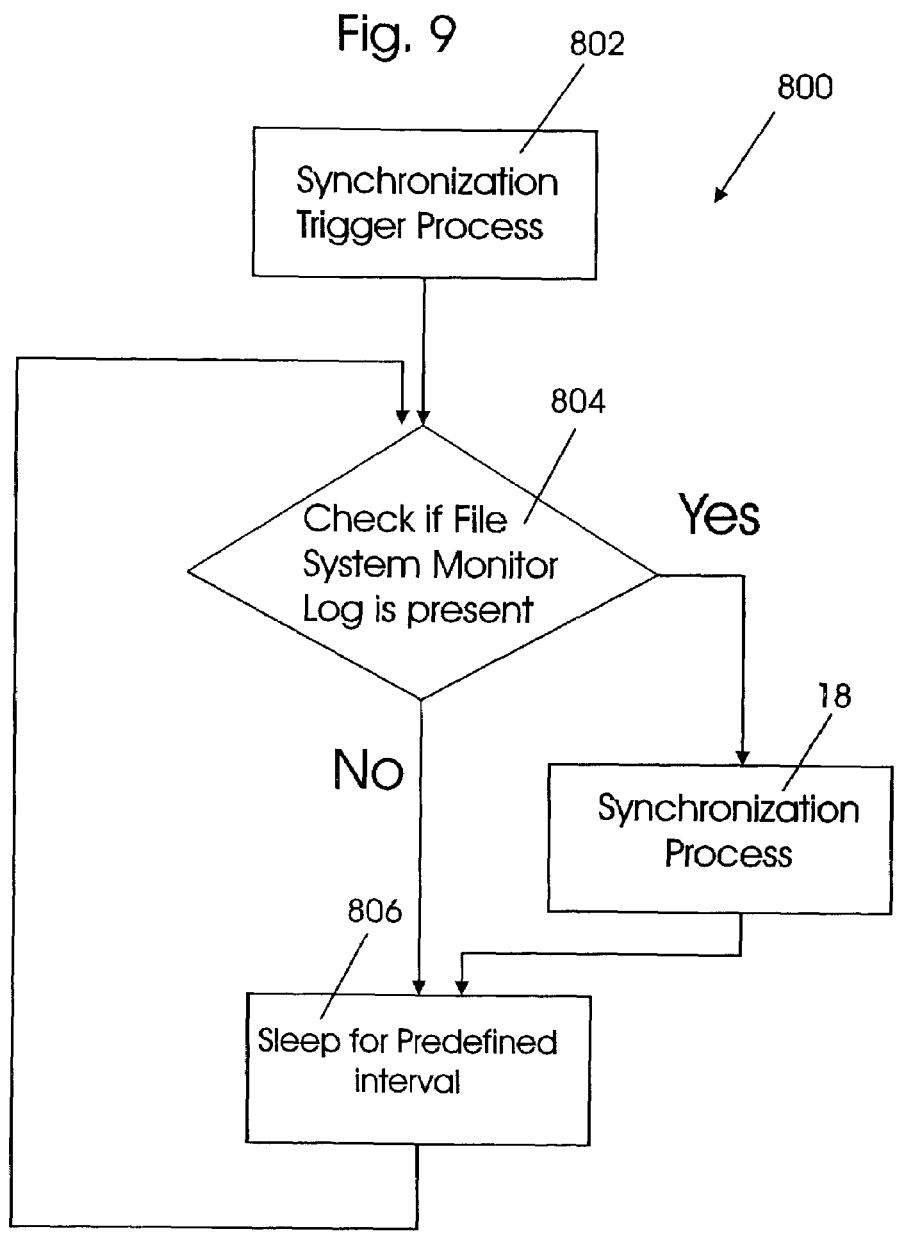

METHOD OF LAZILY REPLICATING FILES AND MONITORING LOG IN BACKUP FILE SYSTEM

FIELD OF THE INVENTION

This invention relates to improved methods and apparatus concerning backup of computer data.

BACKGROUND OF THE INVENTION

It is necessary to backup user computer data to a backup location to save user work from getting lost. There is backup computer software available in the prior art, but most of the backup computer software is only as good as when the user ran the last backup. There is a need to back up user computer data as the user is changing the computer source document, particularly if the user data is critical. This concept is referred to as real time backup. There is some real time backup computer software available in the market today, but it is not adequate.

SUMMARY OF THE INVENTION

The present invention provides a method of performing a real time optimized backup from a source, such as a first computer storage device, to a destination, such as a second computer storage device or backup computer storage device, such as a tape, CD (Compact Disc) ROM (read only memory) or other backup device.

The present invention in various embodiments provides a method of performing real time computer data backups with numerous advantages.

In word processors and office files, even if one file is getting modified, lots of temporary computer files are typically getting created and deleted in the prior art. The present invention in at least one embodiment avoids replicating work on these temporary files as after all, these files are getting deleted in the source also.

For example, assume a user is operating in a typical word processor, such as the Microsoft Word (trademarked) word processor computer software application program being run on a computer processor. Further assume that the user has opened a computer file called "sample.doc" which is stored on a first computer storage device. Further assume that the user types in a change in the form of a paragraph of new text into a window on a computer screen for the computer file "sample.doc" belonging to the word processor. The new paragraph right now exists only in the word processor window. Only when the user decides to save the file, will the new paragraph get written into the first computer storage device.

Further assume that the user, after typing in the new text, clicks on a "file" menu and then a "save" menu to start the process of saving the changes i.e. saving the contents of the word processor window to a new version of "sample.doc" with the new paragraph. In response to the user's clicking on "save" the computer processor executes the save file operation of the word processor, such as for example the Microsoft Word (trademarked) computer software word processor program in this instance as follows: (1) The "sample.doc" file, which does not include the additional paragraph of text, is renamed to "backup.doc". Immediately following renaming, a file named "backup.doc" exists on the first computer storage device and a file named "sample.doc" no longer exists. (2) The contents of the word processor window are written onto the first computer storage device as a file named "new.doc." At this point a file without the additional paragraph ("backup.doc") and a file with the additional paragraph ("new.doc") exist on the first computer storage device. (3) After all of the contents of the word processor window are successfully copied to the file named "new.doc" then the file named "new.doc" is renamed to "sample.doc". Thereafter the file named "backup.doc" is deleted. Following that step the files "new.doc" and "backup.doc" no longer exist on the source (i.e. the first computer storage device). In addition, at this point the file "sample.doc" now includes the additional paragraph of text.

Microsoft Word (trademarked) and other computer software programs perform a "save" operation in the above manner to prevent loss of data. If the contents of the word processor window were written directly to the "sample.doc" file and if for example, the write process only partially completed due to a power failure, then the "sample.doc" file would be corrupted and the newly added contents to the word processor window would be lost since it was not saved anywhere in the first computer storage device. Backing up the "sample.doc" file to the "backup.doc" file ensures that at least the old version of the "sample.doc" file will be saved in case the write from the contents of the word processor window to the "new.doc" file only partially completes.

If we were replicating all the source (first computer storage device) actions, as shown in the above example, in the destination (second computer storage device), we would be rewriting or copying the contents of the word processor window to a file called "new.doc" on the second computer storage device, as well as renaming "sample.doc" (old version) to "backup.doc" and later renaming "new.doc" to "sample.doc" (new version).". However, in one embodiment of the present invention, if only one paragraph in the word processor window contents is new as in the previous example, the computer program of the present invention only writes portions of changed document to the destination Therefore, just as in the above case when in the source a file "sample.doc" is saved, synchronization is triggered after the whole save process for the source (first computer storage device) is complete. But while the save described in the example above happens, a file system request monitor of embodiments of the present invention records in a file system monitor log all the relevant operations happening in the source. For the example given, though logically only one file has changed, there is more than one entry in the file system monitor log. The file system request monitor would have recorded the following in the file system monitor log:

1) "sample.doc" (old version) (on the first computer storage device or source) was renamed to "backup.doc" (on the first computer storage device or source)
2) "new.doc" was created and written (on the first computer storage device)
3) "new.doc" was renamed to "sample.doc" (new version) (on the first computer storage device).
4) backup.doc is deleted (on the first computer storage device).

After the save process is complete on the source, the synchronization process of the one or more embodiments of the present invention is triggered by a monitor log detector. The monitor log detector triggers the synchronization process anytime a file system monitor log is created. The first part of the synchronization process is the analysis process. The analysis process goes through the file system monitor log and looks at all the operations recorded shown above as steps 1)–4) and comes to the conclusion that: (a) "backup.doc" was created and destroyed, so we don't need to worry about it (b) "new.doc" was written into and got saved into sample.doc. Since "sample.doc" existed from before, the end result is that "sample.doc" is modified and we can ignore "new.doc since" it is created and disappears when save is complete. Therefore the end result is that we just need to modify sample.doc to the second computer (destination computer). Assuming there was an old version of "sample.doc" stored on the destination or second computer storage device (having the same data as the old version of "sample.doc" stored on the first computer storage device) than the old version of "sample.doc" on the destination could be merely overwritten with the new version of "sample.doc" from first computer storage device (source) without the intermediate steps done at the source. However, to avoid a similar problem at the destination as at the source, i.e. the corruption of data during a power outage the present invention may also use one temporary file. E.g. if sample (source version).doc (Typically screen changes are already saved to the source (source version).doc then only the backup process is triggered) is to be copied on the destination file sample(Destination version).doc, then the computer request monitor may first copy sample (source version).doc to sampleTmp.doc on the destination. The backup process may rename sampleTmp.doc to sampleDestVersion when the copy is complete.

The file system request monitor at run time is logging the files that are getting modified (in the file system monitor log) and triggers synchronization after a fixed time interval after noticing that files have been modified in the source. The present invention in various embodiments, instead of doing the same set of changes as is happening in the source to the destination, analyzes the semantics of temporary file creation and comes up with the knowledge of what file is getting changed in actuality. This allows the present invention in various embodiments to transfer only portions of the changed file to the destination as opposed to transferring whole of the changed file.

If the same path that is happening in the source, was replicated in the destination, that is rename sample.doc to backup.doc, then write a new file new.doc having all the recent changes, that would be a a full write of new.doc. This is because there is no file in the destination called new.doc. And by the time this copy process is in the process of copying this file, the temporary file new.doc in the source can be deleted. So a background synchronization cannot be done without the present invention. Synchronization process understands the semantics that ultimately, sample.doc is getting updated. If it knows this information, it can trigger synchronization asynchronously to the changes happening at the source. This synchronization can be a different process running in the background at a lower priority, therefore will be triggered when system resources are available. This method of synchronization is termed as lazy replication.

On top of that, using some of the file level differencing and compression techniques, we may not need to transfer the whole file from the source to the destination computer but only portions of it. If backup process is not doing lazy replication, then when new.doc is created (which recreated the new version of file sample.doc in the above example), backup process has to send new.doc to the destination computer. But since there is no new.doc in the destination, whole files needs to be sent and file level differencing cannot be used as there is no version of the file available to compare against the destination. Therefore, without lazy replication, in typical word processor files, it would be impossible to use any of the file level differencing techniques.

A method of performing computer data backups in accordance with an embodiment of the present invention may include only transferring changes in files and not the whole file.

It is possible to run code in two modes—application mode or kernel mode. Most of the user applications run in user mode. Only certain drivers can run in the kernel mode which are referred to as kernel mode drivers. Through a kernel mode driver, it is possible to trap file operations to the source. This kernel driver can be a Virtual Device Driver (VxD) (trademarked) in Windows 9X (trademarked) or a filter driver in Windows NT (trademarked), Windows 2000 (trademarked) or Windows XP (trademarked). We refer to our kernel mode driver in either case as the file system request monitor.

A file system request monitor in kernel mode is setup to monitor all opens, writes, close, deletes and renames to certain selected locations on the first computer storage device. The certain selected locations on the first computer storage device to be monitored are on a file system monitor list (which is stored in computer storage of source computer and is accessible to file system request monitor. It contains a list of locations, which are to be monitored and further processed). How to setup a file system request monitor is described in (1) Mitchell, Stan. "Monitoring File Activity" and MS-DOS/Win32 File System Driver Reference Chapter 7, *Inside the Windows* 95 *File System*, O'Reilly & Associates, ISBN: 156592200X and (2) "Microsoft Windows NT® IFS Kit" and "Microsoft Windows 2000 IFS Development Kit.", Nagar, Rajeev. "Filter Drivers" Chapter 12, *Windows NT File System Internals: A Developer's Guide*. O'Reilly & Associates, IBN: 1565922492. At the time a source file stored on the first computer storage device is closed (such as for example when a Microsoft Word (trademarked) document is closed, the file system request monitor traps this call and determines whether there was a write to the source (the first computer storage device) on this source file since it was opened. (I.e. if there was for example a save operation completed of a new version of the file "sample.doc") If there was a write to the source, a record is entered in a file in the first computer storage device called the file system monitor log saying that this source file has been modified in the first computer storage device. Similarly, for every rename of a source file and delete of a source file, a record is entered in the file system monitor log. A monitor log detector which includes a process in user mode is constantly monitoring creation of file system monitor log (Since the file system request monitor is going to delete the file system monitor log after every synchronization, if the file system monitor log exists that implies that there are certain files which belong to the file system monitor list which have changed and we need to synchronize.). As soon as the monitor log detector sees that file system monitor log has been created, after a sufficient wait, the monitor log detector triggers a synchronization process that will save all the necessary changes to the destination since the last synchronization. The synchronization process determines what are the changes by looking at the file system monitor log.

The method in accordance with an embodiment of the present invention of performing computer data backups can extend this capability to real time acceleration. Real time acceleration implies that when a file is to be accessed over slow link (Dial up link, WAN (wide area network), ISDN (Integrated Services Digital Network) (as opposed to LAN (local area network) connection which is referred to as fast link), the access would be very slow. Therefore, instead of that, a cache, which is stored in the local computer itself would be accessed. But if this cache file is changed, there should be a way to determine that the cache file is changed. The actual remote file should be updated to be always kept in sync with the cache file. In this case, a simplified approach is followed where while this file is accessed in the cache, it is not modified in the actual location by some other process other than our synchronization process. This can be enforced by using locks. For real time acceleration, local cache will be accessed instead of the network files whenever a user is trying to access a network file over slow link. Whenever the local cache changes, we will be able to update the actual file over the slow link. File level differencing techniques like Block level differencing (described by Tridgell, Andrew and Paul Mackerras. "The Rsync Algorithm Technical Report TR-CS-96-05." Department of Computer Sciences, Australian National University, 1996.) will ensure that only the changes are transferred across the slow link.

The methods of the present invention can be applied to computer operating systems such as Windows (trademarked) 9X (("9X" is an unofficial term used to refer these Windows 95 (trademarked), Windows 98 (trademarked), and Windows ME (trademarked), Windows NT (trademarked), Windows 2000 (trademarked), Windows XP (trademarked) workstation and server. The methods can be extended to any other computer operating system. There are two different types of backups provided by the real time optimized backup of the present invention. The two methods are instant replication and lazy replication. In an instant replication approach, as the writes happens to the source, such as for example a first computer, the writes are replicated to the destination, such as for example a second or backup computer. This method is useful for files that only write the changes. A good example of this is Microsoft Outlook PST (trademarked) file or Access (trademarked) file. A description of how instant replication is done follows.

An internal list is maintained in File system request monitor 30 that is termed as file system monitor list 24. This contains the list of paths to be monitored and also information about the pattern and paths for which to use instant replication/lazy replication. When a file is opened, the file system request monitor determines if the file belongs to a path, or a particular computer storage device, such as a computer hard drive, which is to be monitored, i.e. if the file belongs to a source and it is to be backed up using the instant replication by referring to file system monitor list 24. If so, the file's handle, source and destination name combination is added to the internal linked list, which may be stored in computer memory on a source computer accessible to the file system request monitor which we call the current active list 31. The destination file is also opened and the destination file's handle is also stored with the Current active list 31. Whenever a write happens to the source handle, the file system request monitor 30 replicates the same write to the destination. The writes are replicated to the destination for only those files, which are there in the current active list 31 and are marked to be instantly replicated. When a close happens to the source handle, the destination handle is also closed. This process ensures that the file written to the source and its corresponding destination are always kept synchronized. Theoretically, this method is possible for any file type. But it is more efficient for those files on which every save does not rewrite the whole file, but only the changed portions (as mentioned above, the examples are Microsoft Outlook PST (trademarked) file or Access (trademarked) file).

In lazy replication, a real time backup is triggered when a file is closed. This is useful for files that get overwritten every time they are saved and plenty of temporary files are created. A good example of this is saving a document using Microsoft Word (trademarked). In these cases, instant replication would be very expensive. Lazy replication can be divided into four steps: (1) Whenever a computer file changes, it is logged to a file which can be called a file system monitor log. The file system monitor log contains the name of the file that is modified but not the details of the write itself. (2) Determining when a write happens to the file system monitor log and triggering the synchronization process. (3) Determining the actual modified file list by eliminating the temporary files. The semantics of application independent temporary file sequences is to be understood by this stage which we term as analysis process (4) Once it is determined what files are changed by the above stage, the file system request monitor backs up the changed files.

Through the file system request monitor, it is possible to log to a file, which can be called a file system monitor log that a source file gets modified. This kernel driver can be a Virtual Device Driver(VxD) (trademarked) in Windows 9X (trademarked) or a filter driver in Windows NT (trademarked), Windows 2000 (trademarked) or Windows XP (trademarked). It can be the same as the one for instant replication described previously. When a file is opened, it is determined if it belongs to a path which is to be monitored. The file system request monitor maintains a list of paths to be monitored called the "file system monitor list", i.e. if this file belongs to a source to be backed up. If it is to be monitored, its handle and name combination is added to an internal linked list called the "current active list 31". Whenever a write happens to the current active list 31 file, a flag is set in current active list 31 file that this file is modified. When a close happens to the file belonging to the current active list 31 and this file has been modified (we can find this by referring to this file's current active list 31 node), we append this file to the file system monitor log.

An application (user mode application) is running to check if the file system monitor log file is present. This module is referred to as monitor log detector. The very presence of the file system monitor log implies that one of the source files has changed because the file system monitor log is deleted after every synchronization Therefore, as soon as the file system monitor log file is found by the monitor log detector, the monitor log detector triggers the backup or synchronization process.

The backup process (also called the synchronization process) starts with an analysis process. The output of the analysis process is a list of files to be backed up. The list of files to be backed up typically contains three lists: (1) A list of files to be modified at destination, (2) a list of files to be renamed at destination, and (3) a list of files to be deleted at the destination. Going through the contents of the file system monitor log does this. An attempt is made to ignore files that are created and deleted. The files created and deleted are temporary files. Also, if a new file is created and written to and later renamed, the new name is considered as the source of backup During the backup process, help of an additional process running in the destination network is taken. This process on the destination network is called a synchronization server process. Using the synchronization server process, it is possible to transfer only the changes as opposed to transferring the whole file. This is possible by using block level/byte level/compression technology to transfer only the compressed differences between the source and the destination file. In the absence of a synchronization server, the whole file would be transferred.

BRIEF DESCRIPTION OF THE DRAWINGS

FIG. 2 shows a flow chart of a method that the file system request monitor uses to trap calls from an application program;

FIG. 3 shows a flow chart of a method that the file system request monitor uses to handle a create to a file FIG. 4 shows a flow chart of a method that the file system request monitor uses to handle a write to a file;

FIG. 5 shows a flow chart of a method that the file system request monitor uses to handle close to a file;

FIG. 6 shows a flow chart of a method that the file system request monitor uses to handle rename to a file;

FIG. 7 shows a flow chart of a method that the file system request monitor uses to handle delete to a file;

FIG. 8 shows the format of a file system monitor log;

FIG. 9 shows a flow chart of a method that the file system request monitor uses to trigger the synchronization process;

DETAILED DESCRIPTION OF THE DRAWINGS

The present invention provides a method of performing a real time optimized backup from a source, such as a first computer to a destination, such as a second or backup computer, or a tape, CD ROM or other backup device.

Figure 1:
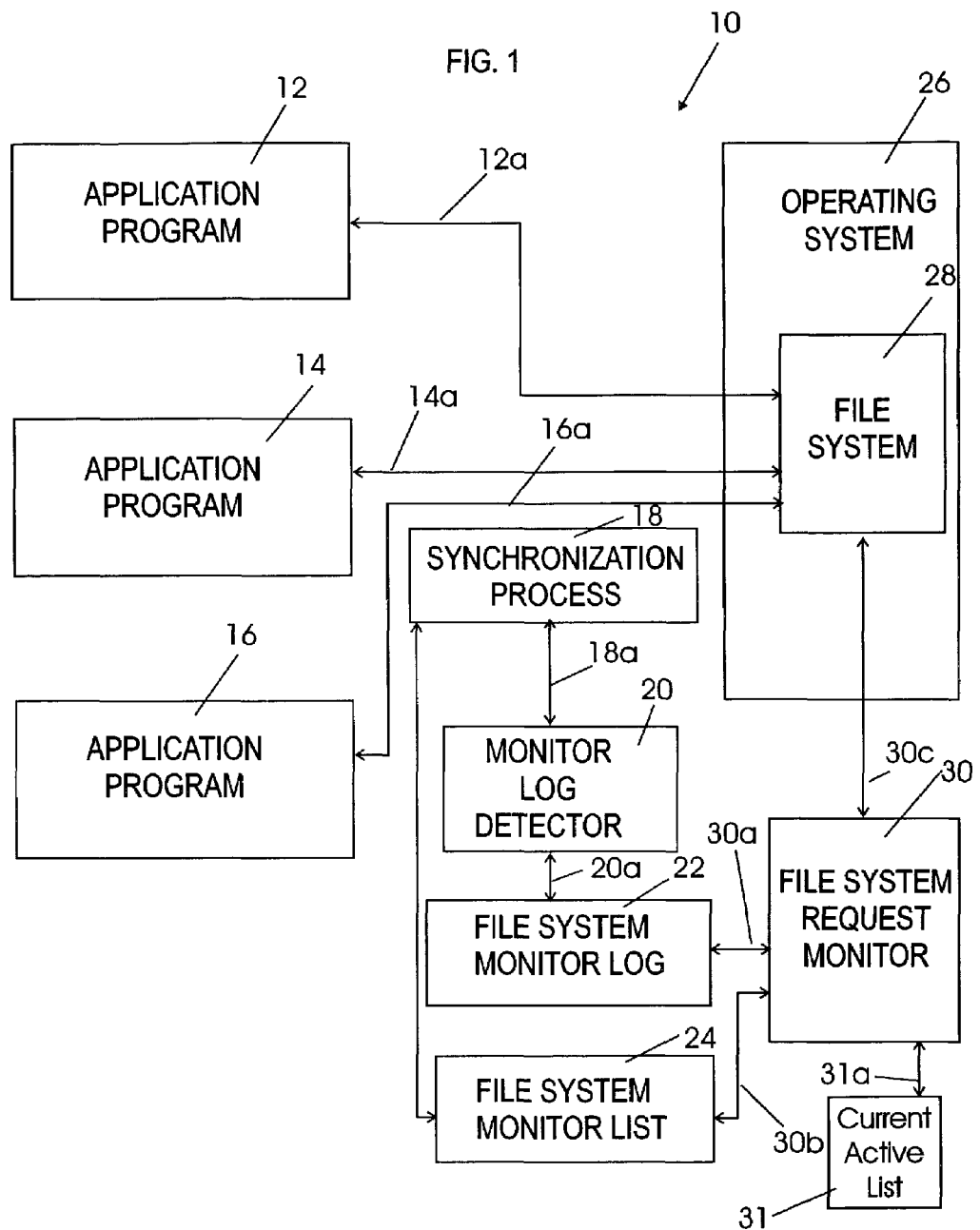
FIG. 1 shows a block diagram of a client computer including a file system request monitor and a synchronization process in accordance with an embodiment of the present invention.

FIG. 1 shows a block diagram of a client computer 10 including a file system request monitor 30 and a synchronization process 18 in accordance with an embodiment of the present invention. The client computer 10 also includes application programs 12, 14, and 16, operating system 26 which includes file system 28, a monitor log detector 20, a file system monitor log 22, and a file system monitor list 24. The client computer 10 also includes a current active list 31, which communicates with the file system request monitor 30 via communications link 31a. The components 12, 14, 16, 18, 20, 26, 28, and 30 may be comprised of computer software running on a computer processor. The file system monitor log 22 is typically a data file, which may reside in computer disk of client computer 10. The file system monitor list is a data file, which may also reside in computer disk of client computer 10 and may be read into the client computer memory from the disk by the file system request monitor. The application programs 12, 14, and 16 may be linked to the file system 28 by communication links 12a, 14a, and 16a. The file system request monitor 30 may be linked to the file system 28 by communication link 30c. The synchronization process 18 may be linked to the monitor log detector 20 by communications link 18a. The monitor log detector 20 may be linked by communications link 20a to the file system monitor log 22. Components 22 and 24 may be linked to the file system request monitor 30 by communications links 30a and 30b, respectively. The communication links 12a, 14a, 16a, 18a, 30a, 30b, and 30c may be computer software procedural calls, or any other type of communication links.

FIG. 1 gives an overall picture of how the synchronization process 18 is triggered as soon as a file in a source, such as a first computer, is modified, deleted or renamed. The source of the file is the computer 10. The file system request monitor 30 in FIG. 1, which may be a kernel mode driver may attach itself over the file system 28 through well-known techniques. The file system request monitor 30 can be a filter driver in Windows NT (trademarked), Windows 2000 (trademarked), or Windows XP (trademarked). The file system request monitor 30 may attach over the file system 28 by using IoAttachDeviceByPointer (trademarked) or similar procedural calls. The file system request monitor 30 in FIG. 1 can be a Virtual Device Driver in Windows 95 (trademarked), Windows 98 (trademarked), Windows ME (trademarked), hooking over the file system 28 through a procedural call named "IFSMgr_InstallFileSystemApiHook" (trademarked). When the file system request monitor 30 is attached over the file system 28, all the calls to the file system 28 also go through the file system request monitor 30.

Whenever, an application program, such as one of application programs 12, 14, and 16, does a file access (which will also be called a file system request, file system access, or file access request), the file access is handled by the file system 28 which is part of the operating system 26. This call is in turn passed over to the file system request monitor 30, which is attached to the file system 28.

The synchronization process 18 understands the source (such as computer 10) and destination (such as a backup computer not shown) of the real time optimized backup. This information can be stored in a file located in the computer 10. This is called a file system monitor list 24. As an example, it will contain the information that "c:\source\sample folder" is to be backed of to "\\Backupserver\backupshare\userx\sample folder". This can be created based on the user preference. The user would know which is the location he wants to backup and what would be the destination of the backup. The destination of the backup would be another computer located in the same LAN or connected to computer 10 over a slow link like RAS, WAN or ISDN. The synchronization process 18 understands the file system monitor list 24. Therefore, if the synchronization process 18 has to backup a file "C:\source\sample folder\subdir\sample.doc" it looks up the file system monitor list 24. It knows that this file is to be backed up to "\\Backupserver\backupshare\userx\sample folder\subdir\sample.doc." Therefore, if the synchronization process 18 is given the information that a source file is modified, it knows where the destination of the backup would be and what file is to be backed up so that the backup is in sync with the source.

The file system monitor list 24 will also specify which file types require lazy replication and which files require instant replication. Using this information, file system request monitor 30 can determine whether it has to process a given file system request further or not. If either instant or lazy replication is to be used, file system request monitor processes the request further. Otherwise, the call is ignored. It may be desired to have a memory based list image of file system monitor list 24 in the source computer memory of file system request monitor for quicker lookups. The file system request monitor 30 will trap file system calls to all the files residing in the computer 10. The file system request monitor 30 consults the file system monitor list 24 to decide whether a particular file is a relevant source and therefore, if that particular file needs to be backed up to a destination location belonging to a backup computer, or if the file belongs to a path that is of no consequence to us.

FIG. 1 shows an example, where there are three application programs, 12, 14, and 16 running on the client computer 10. Whenever anyone of these application programs 12, 14, and 16 makes a file access request, the file access request goes to the file system 28. Since the file system request monitor 30 is attached to the file system 28, the file access request goes to the file system request monitor 30 after the file access request is handled successfully by the file system 28. The file system request monitor 30 determines whether this call or file access request is of interest for backup purposes by looking at file system monitor list 24.

FIG. 2 shows a flow chart 100 of a method in accordance with an embodiment of the present invention that the file system request monitor 30 uses to trap file access requests from an application program, such as one of the application programs 12, 14, and 16 in FIG. 1. At step 102, a particular application program, such as one of programs 12, 14, and 16, makes a file access or file system request, to the file system 28. The operating system 26 and the file system 28 process the file system request at step 104. If the file system request is not processed successfully at step 106 then the file system request is not processed any further at step 124. Otherwise, if the file system request is processed successfully, the file system monitor list 24 is queried by file system request monitor 30 at step 108. The file system monitor list 24 advises whether a particular file is to be monitored. If the file in the file system request is not to be monitored then the method proceeds to step 124 where no further processing of the file system request will occur.

If the file is to be monitored, then at step 112 it is determined whether this is a valid file system request type that file system request monitor needs to process further. If not, then the method proceeds to step 124. If this is one of the file system request type that file system request monitor 30 needs to process further, then processing proceeds with one of steps 114, 116, 118, 120, or 122 depending on whether this is a create file, write file, close file, rename file, or delete file system request, respectively. After an appropriate procedure is executed the method proceeds to step 124.

FIG. 2 describes all the calls, i.e. the file system requests, that are of interest to the file system request monitor 30. The file system request monitor 30 checks whether this file system call or file access request, belongs to a location that is of interest to the file system request monitor 30 by performing a lookup on the file system monitor list 24. If the file access request (or file system call) is of interest to the file system request monitor 30, then monitor 30 needs to record this file access request or call to the file called the file system monitor log 22. FIG. 8 details the structure of the file system monitor log 22 and will be described later.

The monitor log detector 20 in FIG. 1 is a process, which is constantly looking for the presence of the file system monitor log 22. The file system monitor log 22 is typically just a file which stores the names of the files modified/deleted/renamed. After a synchronization, the file system monitor log 22 file is deleted. Therefore, the presence of the file system monitor log 22 implies that something has been modified which is of interest to us since the last synchronization process. As soon as the monitor log detector 20 finds the file system monitor log 22, the monitor log detector 20 quickly triggers the synchronization process 18. The synchronization process 18 goes through the file system monitor log 22 and determines the files to be backed up and their destinations. Subsequently, the synchronization process 18 synchronizes the files to be backed up and deletes the file system monitor log 22.

Instant replication versus lazy replication will now be described. Real time optimized backup in accordance with embodiments of the present invention follows two different methods for backing up two different file types. The first type of file is typically a data base file. Whenever a save is done for a data base file, only the changed portion of the file is written to a computer disk. For data base files, as the writes of the changed portion of the file happen to a source, such as a source computer disk, the changed portion of the file is also written to a destination, such as a destination computer disk. The data base file names typically do not get recorded to the file system monitor log 22 (file system monitor log contains only names of files and whether it was modified/deleted/renamed/created but not the actual writes), since the changes are immediately replicated to the destination, such as a destination computer disk. This method is termed instant replication. In these cases, the synchronization process 18 does not need to worry about backing up these files. These files are instantly backed up by the file system request monitor 30. It is inexpensive to use this method in this case for data base files, as when a save is done to this file, only the new changes are written to the source computer disk as opposed to rewriting the whole file.

However, there are certain files which when saved through their respective editors are totally rewritten irrespective of the changes that have happened. A typical application is Microsoft Word (trademarked) document files. To edit a Microsoft Word (trademarked) document file, you have to use an application like Microsoft Word (trademarked). So in this case, Microsoft Word (trademarked) is the editor for Microsoft Word (trademarked) documents. Using instant replication would not be efficient for these file types because they typically overwrite the whole file when saving the file. Similarly, instant replication may not work well for Microsoft Word (trademarked) document or similar file types also because they use plenty of temporary files. When a Microsoft Word (trademarked) file is saved, it may be first saved to a backup file, and then written to a work file. The backup file and the work file are typically saved as files having a name different from the original file, and typically on the computer disk from which the original file came, such as a computer hard drive disk. Subsequently the work file is renamed to the original file. If everything was successful, then the backup file is deleted. Replicating all of these actions instantly would be very expensive. Therefore, in these cases, a technique, which will be called lazy replication, is used in accordance with various embodiments of the present invention. The advantages are manifold. Not only are unnecessary replication tasks prevented, but also a block or byte level differencing method can be used to transfer only the changes between the source file and the backup file as opposed to transferring the whole file. Also, synchronization can be triggered in the background without really holding up the editor application, which would have been necessary if instant replication was being done (slowness would be relatively more since the editor application rewrites the whole file).

The handling of file system requests by the file system request monitor 30 will now be further described. One of the application programs or programs 12, 14, and 16, makes a file system request or call and it is serviced by the file system 28 in the operating system 22. The file system request monitor 30 then processes the file system call. If there was an error in processing the file system request by the file system 28, then the file system request is not processed any further by the file system request monitor 30. Looking at an error code in the file system request describing the file system call can determine this. The file system request monitor 30 performs a lookup on the file system monitor list 24 to see if a file specified in this file system request is to be monitored. If the file specified in this file system request is to be monitored that implies that this is a file belonging to a source of a real time optimized backup. If the file in the file system call is not to be monitored, then the file system request monitor 30 does not process the file system request any further.

If the file in the file system request is to be monitored then the file system request monitor 30 determines if the file system request is a create call (also called an open call), a write call, a close call, a rename call, or a delete call. If the file system request is a create call or an open call, the file system request is transferred to a create/open handler which is further discussed in FIG. 3. This is the case if the call is IRP_MJ_CREATE in Windows NT (trademarked), Windows 2000 (trademarked), or Windows XP (trademarked) or IFSFN_OPEN in Windows 95 (trademarked), Windows 98 (trademarked), or Windows ME (trademarked) These are predefined macros which can be used as is for the purpose of one or more embodiments of the present invention. The term "IFSFN" stands for Installable File System Function and the term "IRP" stands for Interrupt Request Packet.

If the file system request is a write call, it is transferred to a write handler that is further discussed with reference to FIG. 4. This is the case and if the file system call is IRP_MJ_WRITE in Windows NT (trademarked), Windows 2000 (trademarked), or Windows XP (trademarked) or IFSFN_WRITE in Windows 95 (trademarked), Windows 98 (trademarked) and Windows ME (trademarked). If the file system request is a close call, it is transferred to a close handler that is further discussed in FIG. 5. This is the case if the call is IRP_MJ_CLOSE/IRP_MJ_CLEANUP in NT/2000/XP or IFSFN_CLOSE in Windows 95/98 and ME. If the file system request is a rename call, the file system request is transferred to a rename handler that is further discussed with reference to FIG. 6. This is the case if the file system request is IRP_MJ_SET_INFORMATION in Windows NT(trademarked), Windows 2000 (trademarked), or Windows XP (trademarked) or IFSFN_RENAME in Windows 95 (trademarked), Windows 98 (trademarked), and Windows ME (trademarked). If the file system request is a delete call, it is transferred to a delete handler that is further discussed with reference to FIG. 7. This is the case if the file system call is IRP_MJ_SET_INFORMATION in Windows NT (trademarked), Windows 2000 (trademarked), or Windows XP (trademarked) or IFSFN_DELETE in Windows 95 (trademarked), Windows 98 (trademarked) and Windows ME (trademarked).

FIG. 3 shows a flow chart 200 of a method that the file system request monitor 30 uses to handle a create to a file. The execution of step 114 of FIG. 2 causes the method of FIG. 3 to be performed. The method begins at step 202. At step 204 it is determined whether the subject file is to be instantly replicated (name of the file can be obtained from the description of the file system request. This description is made available by the file system 28) by referring to file system monitor list 24. If the answer is no, meaning that lazy replication of the file is to be performed, then the file system request monitor 30 next determines at step 212 if the same file existed before the call to the create method of FIG. 3. If not, then at step 216 this source file information is added to the current active list 31 on the client computer 10 with information that the file is newly created. Current active list contains information about each file which is open and currently being handled by file system request monitor 30. Each node in this list contains information about an open file i.e. source file name, destination file name, source file handle, destination file handle, a flag to indicate whether instant replication or lazy replication is being used, a flag to indicate whether this file is dirtied in the source since the file was opened and a flag to indicate if this file was newly created or it existed from before. If this file is newly created, a node is added to the current active list 31 (the current active list 31 is a memory structure that resides in the electronic or computer memory of the file system request monitor 30.). The added node contains information about the file handle, source file name and information in a field that if this file is to be lazy replicated and that this file is newly created. Note that when a file (referred to by name) is opened, we obtain a file handle. Subsequent calls like read and write use this handle to access this particular file. The particular handle is typically valid till a close happens. The method of FIG. 3 then returns from the create file procedure of FIG. 3 at step 214 and back to step 124 where no further processing of this file system request is performed. Note that the file system 28, is not necessarily waiting for the next call, since the file system 28, may be handling multiple calls, which are typically, asynchronous calls.

If the same file did exist at step 212 then the file system request monitor 30 then adds a node to the current active list 31. (If this file already existed, a node is added to the current active list 31. The added node contains information about the file handle, source file name and information in a field that this file is to be lazy replicated and that this file already existed. The method or function then returns from the create file procedure at step 214.

If the file in the file system request was to be instantly replicated then at step 206 the file system request monitor 30 consults the file system monitor list 24 to get the destination location for a backup of the file in the file system request. This destination file is opened at a destination such as another computer not shown. At step 208, source and destination information is added to current active list 31 which is one of the lists which is kept or which is part of the file system request monitor 30 on the client computer 10. The current active list 31 in this case, contains information about the file handle, source file name, destination file name, destination file handle, and information in a field that this source file is to be instantly replicated. Note that when a file (referred to by name) is opened, we obtain a file handle. Subsequent calls like read and write use this handle to access this particular file. The particular handle is typically valid till a close happens. The method then proceeds to the return step 214.

FIG. 4 shows a flow chart 300 of a method that the file system request monitor 30 uses to handle a file system write. The execution of step 116 of FIG. 2 causes the method of FIG. 3 to be performed. The method begins at step 302. At step 304 the file system request monitor 30 determines if the file handle in the file system request or call matches an entry in the current active list 31, which is stored on the client computer 10. This is done by matching the file handle in this file system request with any source handle in the current active list 31. If not, then the method in FIG. 4 is exited at step 305 and the file system request monitor 30 next would execute step 124 of FIG. 2. If the file handle is in the current active list 31 of file system monitor list 24 then the file system request monitor 30 determines if the file is to be instantly replicated at step 306. This is obtained by referring to current active list 31 for this file. There is a field in the information corresponding to this file in current active list 31 as to whether instant replication or lazy replication is to be used. If not, meaning that lazy replication is to be performed, then the file system request monitor 30 marks in the current active file list node for this file that this file is dirtied ("dirtied" means that the file is out of sync with the corresponding destination file). If the file is to be instantly replicated then at step 308 the file system request monitor 30 replicates this write to the destination (Every write call has parameters including the location (offset from the beginning) to write to and what to write. Replicating a write means to do a write on the destination at the location (offset) of the destination which is the same offset as described by this write and write the same buffer at that location which happened on the source) (E.g. if a write is done on the source file sample.doc at the $10^{th}$ location writing the buffer" new entry", in the destination sample.doc we go to the $10^{th}$ location and do the same write "new entry"). The procedure is then exited at step 314 to return to step 124 of FIG. 2. The handle of the destination file is obtained from the node in current active list 31 corresponding to this file. This is required to replicate the write to the destination.

FIG. 5 shows a flow chart 400 of a method that the file system request monitor 30 uses to handle a close to a file. The execution of step 118 of FIG. 2 causes the method of FIG. 5 to be performed. The method begins at step 402. At step 404 the file system request monitor 30 determines if the file is in the current active file list located in the file system request monitor 30, which is stored on the client computer 10. This is done by matching the file handle in this file system request with any source handle in the current active list 31. If not, then the method is exited at step 406 and the file system request monitor 30 next would execute step 124 of FIG. 2. If the file is in the current active list 31 of the file system monitor list 24 then the file system request monitor 30 determines if the file is to be instantly replicated at step 410. If not, i.e. lazy replication is to be performed, then the file system request monitor 30 determines if the file is dirtied by looking at the entry for the file in the current active list 31 at step 412. This field was marked as dirty when a write happened to this file in 310. If the file is not dirtied then the method is exited at step 406. This would be the case when a file was opened but no write happened to it. If the file is dirtied then the file system request monitor 30 next determines if the file is newly created at step 414 by looking at the corresponding current active list entry. The entry was marked in the step 210/216 in FIG. 3. If not, then at step 418 an entry is made for this file as modified in the source (MODIFIED LOG ENTRY 704) in the file system monitor log 22 of the client computer 10 shown in FIG. 1. This implies that the file has been modified in the source (and therefore, the contents of the file in the source is not the same as its corresponding destination file). The file system request monitor 30 then frees the current activity list entry for this file at step 420 and then returns at step 422 and next executes step 124 of FIG. 2. If the file is newly created, as determined in step 414 then at step 416 the file system request monitor 30 makes an entry in the file system monitor log 22 of FIG. 1, for this file as newly created. By looking at the current active list 31 on the file system monitor list 24, the file system request monitor 30 can determine, whether this file is newly created or not. If it is newly created, the file system request monitor 30 makes an entry into the file system monitor log 22 that this file is newly created (NEWLY CREATED LOG ENTRY 702). The entry for this file in the current active list 31 is then removed. If the file is not newly created, the file system request monitor 30 makes an entry into the file system monitor log 22 that this file is modified (MODIFIED LOG ENTRY 704). The entry for this file in the current active list 31 entry is then removed.

Steps 420 and 422 are thereafter executed. If the file was to be instantly replicated at step 410 then the file system request monitor 30 retrieves the destination file handle from the current activity list and the destination file is also closed at step 408. The entry for the file in the current active list 31 in the file system monitor list 24 is then removed. Thereafter steps 420 and 422 are executed.

FIG. 6 shows a flow chart 500 of a method that the file system request monitor 30 uses to handle a file system rename. The execution of step 120 of FIG. 2 causes the method of FIG. 6 to be performed. The method of FIG. 6 begins at step 502. At step 504 the file system request monitor 30 determines if the source or destination file in the file system request is in the current active file list, which is in the file system request monitor 30 on the client computer 10. A file handle for the file in the file system request is obtained from the particular file system request and the file system request monitor 30 determines whether the file handle matches an entry in the current active list 31 in the file system monitor list 24 in FIG. 1. If the first handle does not match such an entry, the function or procedure returns from here (In Windows 95 (trademarked), Windows 98 (trademarked), Windows ME (trademarked), rename is not a handle based call. Therefore, the file request system request monitor 30 is typically programmed to refer directly to the file system monitor list 24 as to whether this file name in the file system request needs to be backed up.

If the file is not in the current active list 31 in the list 24, then the method is exited at step 506 and file system request monitor 30 next would execute step 124 of FIG. 2. If the file is in the current active list 31 then the file system request monitor 30 determines if the file is to be instantly replicated at step 508. If not, then at step 512, the file system request monitor 30 makes an entry in the file system monitor log 22 shown in FIG. 1, for renaming the file with both the old name and the new name for the file. This implies that when the synchronization process 18 is triggered, it knows that this file was renamed on the source (i.e. the first computer storage device). Since both the old name and the new name are stored, the synchronization process 18 knows the file which has been renamed and what has it been renamed to. If the file in the file system request is to be lazy replicated, the file system request monitor 30 makes an entry into the file system monitor log 22 that this file is renamed. The file system monitor log 22 entry contains both the name of the file stored at the source and the new name of the source file(RENAME LOG ENTRY 706).

If the file is to be instantly replicated then at step 510 a rename is done on the destination. The destination file name is retrieved from the current active list 31. A new name for rename of source is available as a part of the file system request. The destination file is also renamed to replicate the source action. After either steps 510 or 512 the method of FIG. 6 is exited at step 514 and the file system 28 next executes step 124 of FIG. 1.

FIG. 7 shows a flow chart 600 of a method that the file system request monitor 30 uses to handle a file system delete. The execution of step 122 of FIG. 2 causes the method of FIG. 6 to be performed. The method of FIG. 6 begins at step 602. At step 604 the file system request monitor 30 determines if the file is in the current active file list in the file system request monitor 30, which is stored on the client computer 10. The file handle of the file in the file system call is obtained from this file system call by the file system request monitor 30 and the file system request monitor 30 determines whether this file handle matches a source file handle in the current active list 31. If the file handle does not match such as entry, the function returns from here (In Windows 95 (trademarked), Windows 98 (trademarked), or Windows ME (trademarked), delete is not a handle based call. Therefore, the file system request monitor 30 refers directly to the file system monitor list 24 as to whether this file is of interest to us or not. If not, then the method is exited at step 606 and file system request monitor 30 next would "execute step 124 of FIG. 2, and thereafter wait for the next file system request. If the file is in the current active list 31 then the file system 28 determines if the file is to be instantly replicated at step 608. If not, then at step 612, the file is to be lazy replicated and the file system request monitor 30 makes an entry into file system monitor log 22 that this file is deleted (DELETE LOG ENTRY 708).

If the file is to be instantly replicated then at step 610 a delete is done on the destination to keep the destination in sync with the source. The destination file name is retrieved from the current active list 31. The destination is also deleted to replicate the source action. After either steps 610 or 612 the method of FIG. 7 is exited at step 614 and the file system 28 next executes step 124 of FIG. 1.

FIG. 8 shows the format of a plurality of file system monitor log entries 700 which may be stored in the file system monitor log 22 of the client computer 10 shown in FIG. 1. The file system monitor log entries 700 are recorded by the file system request monitor 30. The file system monitor log entries 700 may include 4 types of records in any specific order or any number of times. These may be of the type newly created log entry 702, modified log entry 704, rename log entry 706, and delete log entry 708. The newly created log entry 702 includes a type of log entry or sub entry, which in this case is "newly created log entry", a file name entry or sub sentry, which may be the name of the file created, and a second name for the file which may be unused. The modified log entry 704 includes a type of log entry or sub entry which in this case is "modified log entry", a file name which can be the name of the file to be modified, and a second name for the file which may be unused. The rename log entry 706 includes a type of log entry or sub entry which in this case is "rename log entry", a file name entry or sub entry which may be the old name of the renamed file, and a second name which may be the new name of the renamed file. The delete log entry 708 includes a type of log entry which in this case is "delete log entry", a file name entry or sub entry which may be the name of the file deleted, and a second name entry which in this case may be unused.

FIG. 9 shows a flow chart 800 of a method that the monitor log detector 20 uses to trigger the synchronization process 18 of FIG. 1 upon detection of the file system monitor log 22. (A monitor log detector 20 runs constantly to see if the file system monitor log 22 has been created.) File system monitor log 22 can be created or appended further by the execution of the steps 416 and 418 in FIG. 5, 512 in FIGS. 6 and 612 in FIG. 7. The method of FIG. 9 starts at step 802. At step 804 the monitor log detector 20 checks if the file system monitor log 22 is present. If not, then at step 806 the monitor log detector 20 does nothing or "sleeps" for a predefined interval of time. If the file system monitor log 22 is present then the synchronization process 18, which is also identified in FIG. 1, is triggered by the monitor log detector 20. It is recommended that before triggering synchronization, there should be a wait of a pre-configured interval of time. This interval may be larger than the time taken to save largest of the files to synchronize. This makes sure that all the temporary files for associated with saving a file would be considered in this synchronization itself.

Figure 10:
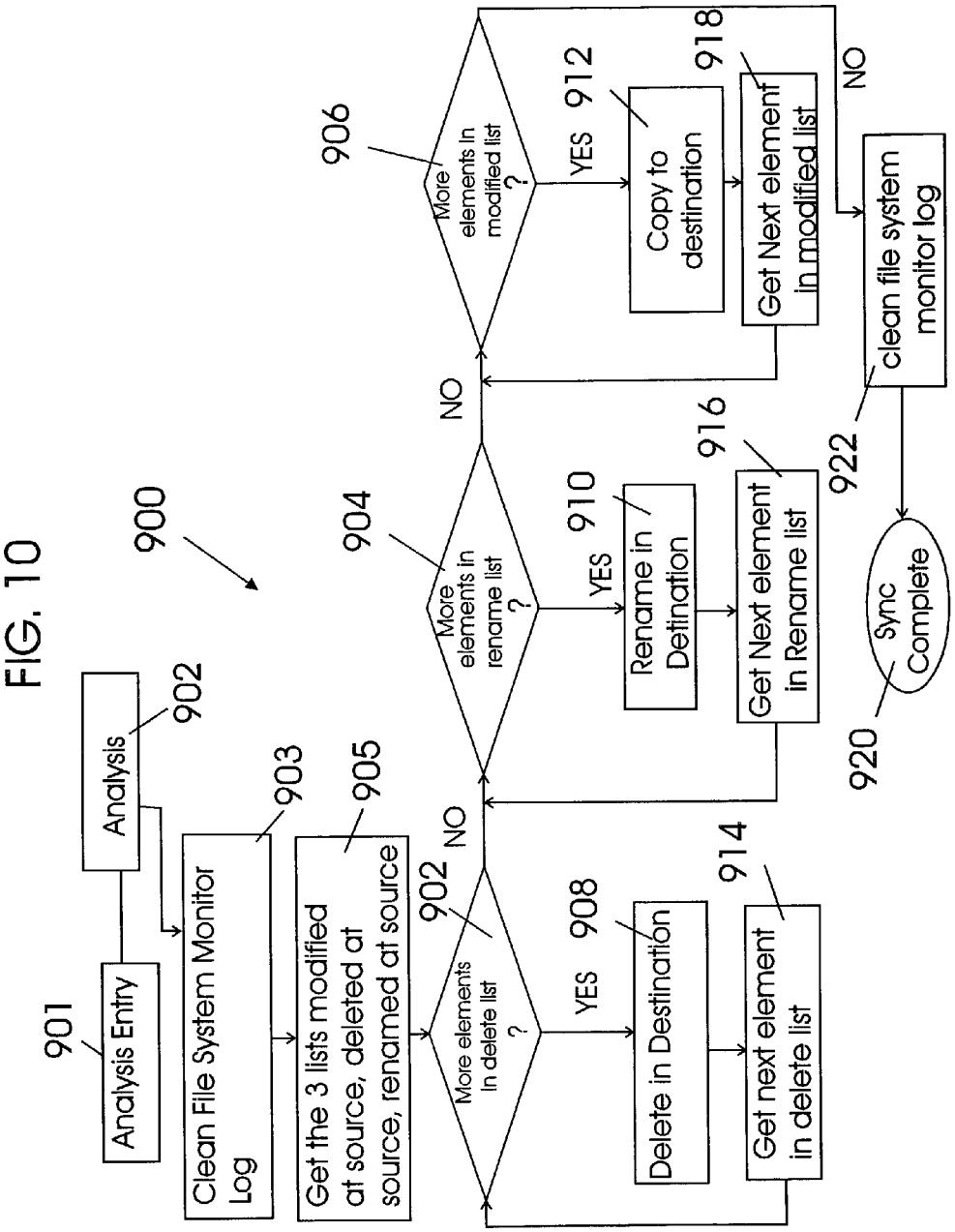
FIG. 10 shows a flow chart that gives a broad overview of the synchronization process.

FIG. 10 shows a flow chart 900, which is a broad overview of the synchronization process 18. The synchronization process 18 is comprised of an analysis process and a copy process. The analysis process is started at step 901. At step 903, file system request monitor 30 cleans the file system monitor log 22 of FIG. 1. At step 901 the file system request monitor 30 determines what files have been changed. The output of the analysis process at step 905 would be three lists—(1) a list of files that have been modified in source, (2) a list of files that have been renamed in source and (3) a list of files that are deleted in source. For files deleted in the source, at step 902, the corresponding file is deleted in the destination at step 908, and the process loops back at step 914 for another file (or element) in the delete list. Once all the members in the delete list are handled, synchronization process moves to the rename list. For files renamed in the source, at step 904, the corresponding file is renamed in the destination at step 910 and the next file or element in the rename list is retrieved at step 916 and 904. For files modified in the source, at step 906, the corresponding updated file is copied to the destination at step 912, and the next file or element in the modified list is retrieved at step 918 and 906. The process shown by flow chart 900 is over when there are no files left in the delete list, rename list, or modified list and then steps 922 and 920 are executed indicating that the file system monitor log 22 is clean (i.e. no files left in list) and that synchronization between the source and the destination (i.e. backing up of all pertinent files) has been achieved. (Please note that we are only talking about lazy replication in this case as instant replication changes have already been reflected to the destination as they were being made in the source.)

Figure 11:
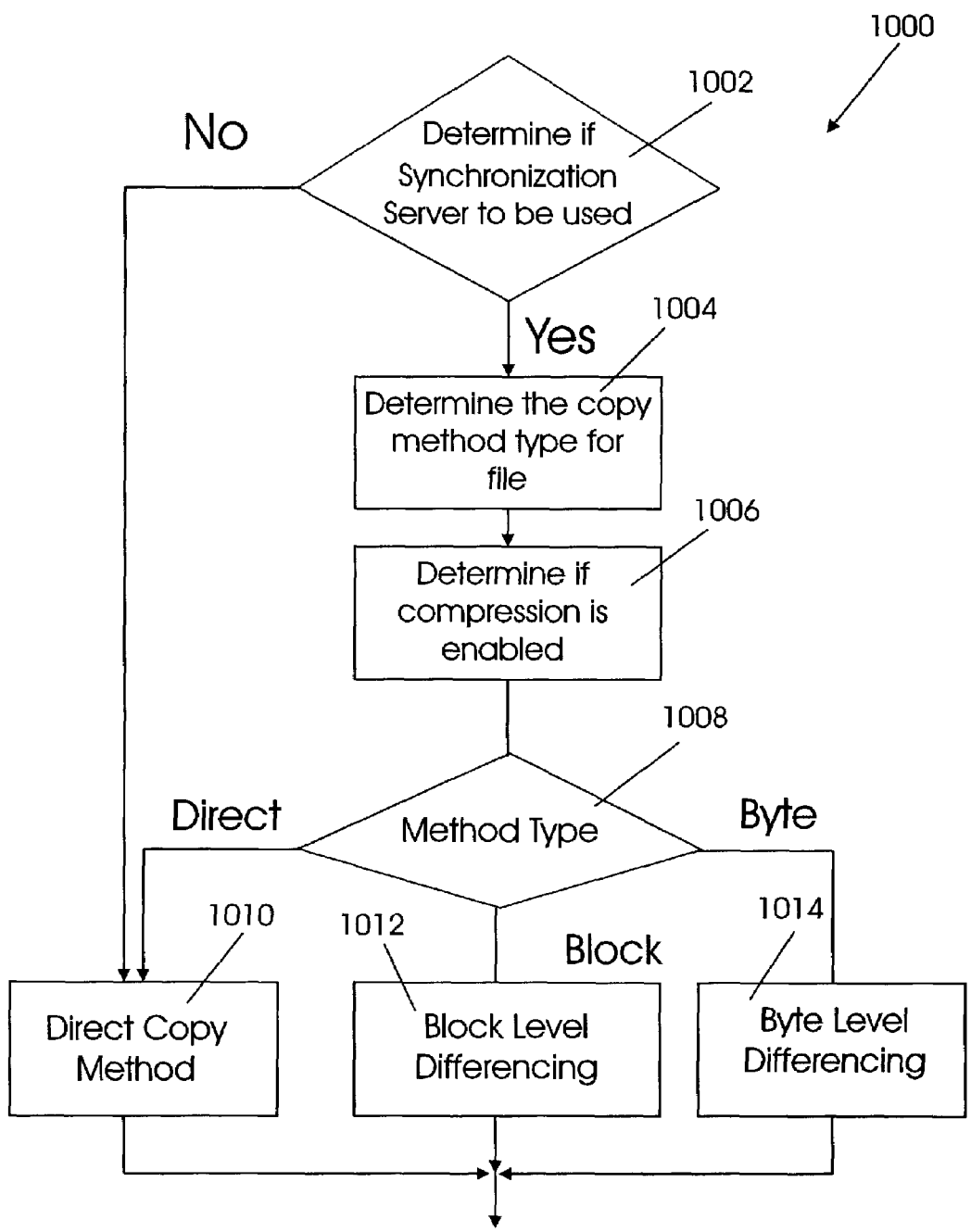
FIG. 11 shows a flow chart that describes the copy process in more detail.
Figure 28:
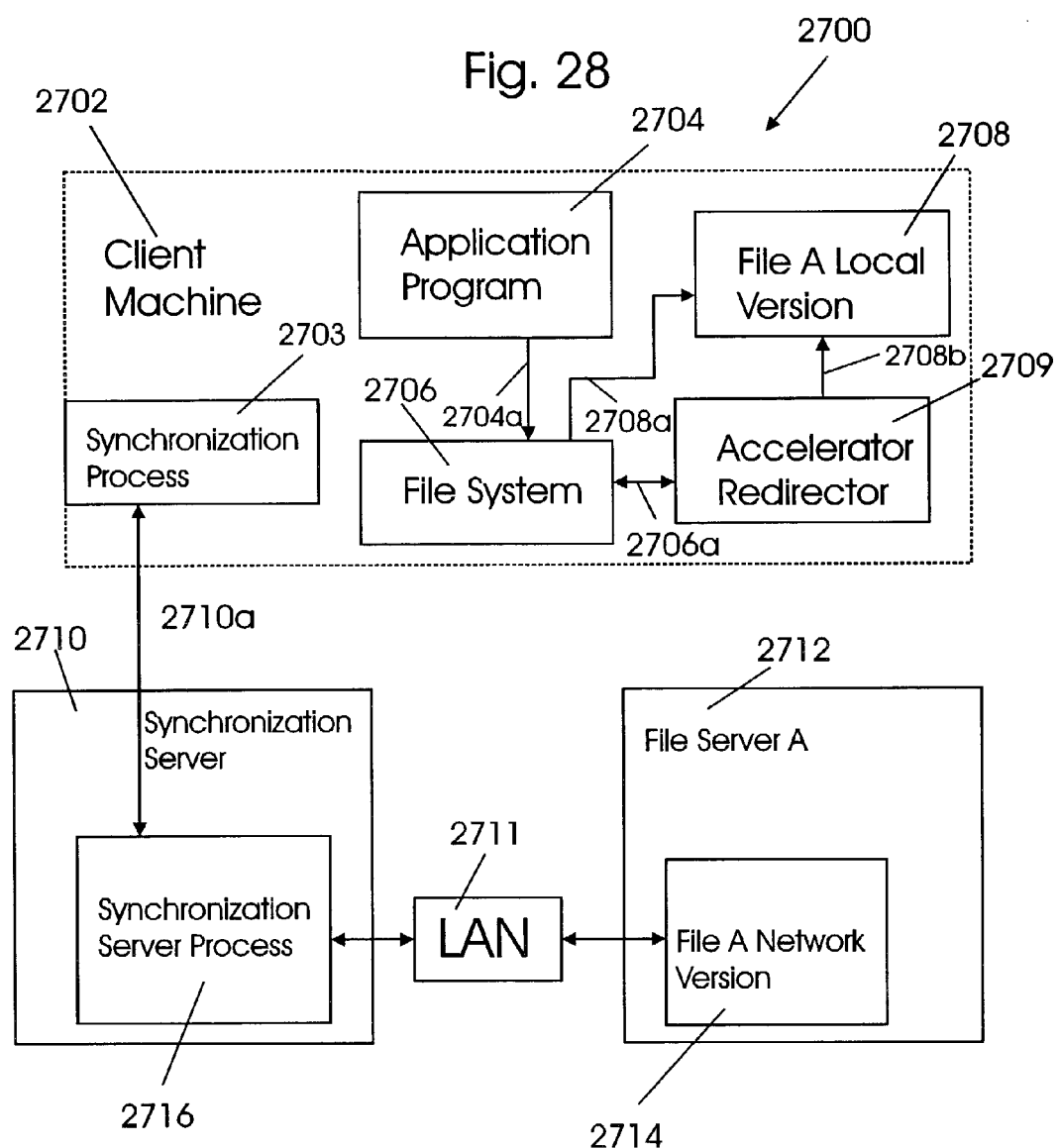
FIG. 28 shows a diagram in the same client machine above synchronizing over a slow connection using a synchronization server.

FIG. 11 shows a flow chart that describes the copy process executed during step 912 of FIG. 10 of the synchronization process 18 in more detail. The copy process is called for every file that has been analyzed to be copied as from step 912 of FIG. 10 (by virtue of its presence in the list of files modified in the source). At step 1002 the synchronization process 18 of FIG. 1, determines if the synchronization server, such as synchronization server 2710 to be described with reference to FIG. 28, is to be used. If not, then a direct copy method is executed at step 1010 and then this file is updated in the destination. The copy process 904 of the synchronization process 18 looks for an application computer program running on a destination network that can help the copy process 904 in transferring only the changes in between the source and destination instead of transferring the whole files. We refer to this program as synchronization server application. In the absence of this application program on the destination side, typically the only method that would be possible would be a full copy of the source to the destination.

If the synchronization server is to be used, the copy process next determines the copy method type to be used and determines if compression is enabled at step 1006. Depending on the file type and user preference which is stored in file system monitor list 24 in FIG. 1, compression can be enabled or disabled. Synchronization process reads the information from file system monitor list 24. The method type is examined at step 1008 by the synchronization process. If the method type is direct then a direct copy method is executed at step 1010, i.e. the file in the file system request is entirely copied. If the method type is block then a block level differencing method is executed at step 1012. Block level differencing has been described by Tridgell, Andrew and Paul Mackerras. "The Rsync Algorithm Technical Report TR-CS-96-05." Department of Computer Sciences, Australian National University, 1996. If the method type is byte then a byte level differencing method is executed at step 1014. Byte level differencing has been described by Core Data Inc, After any of the steps 1010, 1012, or 1014, the file is updated at the destination.

If it is determined that a full copy is needed, depending on compression being on/off, the copy process 904 of the computer 10 may do a full copy or compressed copy. If it is determined by the copy process that block level differencing is required, only the changes between the source and destination using block level differencing may be transferred. If compression is enabled, the copy process may further compress the data that is going to transfer.

If it is determined by the copy process 904 of the computer 10 that byte level differencing will be used, only the changes between the source and destination using byte level differencing may be transferred. If compression is enabled, the copy process 904 of the computer 10 may further compress the data that is going to be transferred.

Figure 12:
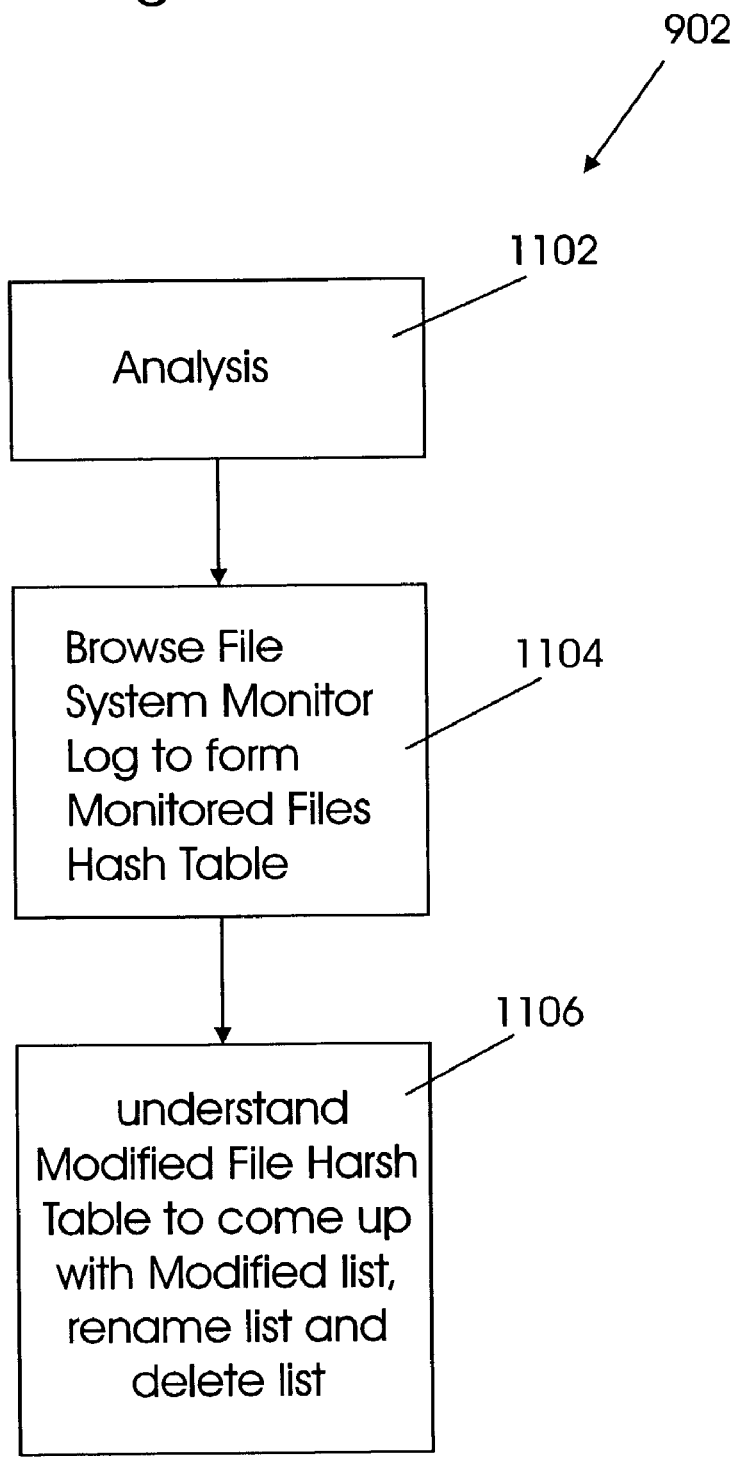
FIG. 12 shows a flow chart that describes an analysis process in accordance with an embodiment of the present invention.

FIG. 12 shows a flow chart that describes the analysis process 902 of FIG. 10 in accordance with an embodiment of the present invention. The analysis process 902 is triggered only when file system monitor log 22 is present i.e. something has definitely changed in the source. The computer 10, using the analysis process 902, is going to find out what files have changed so that the copy process can update only those files. The list of files that have changed are only those files that are to be lazy replicated as for instant replication, the changes are already done by the file system request monitor 30 in the step 308 of FIG. 4.

Figure 13:
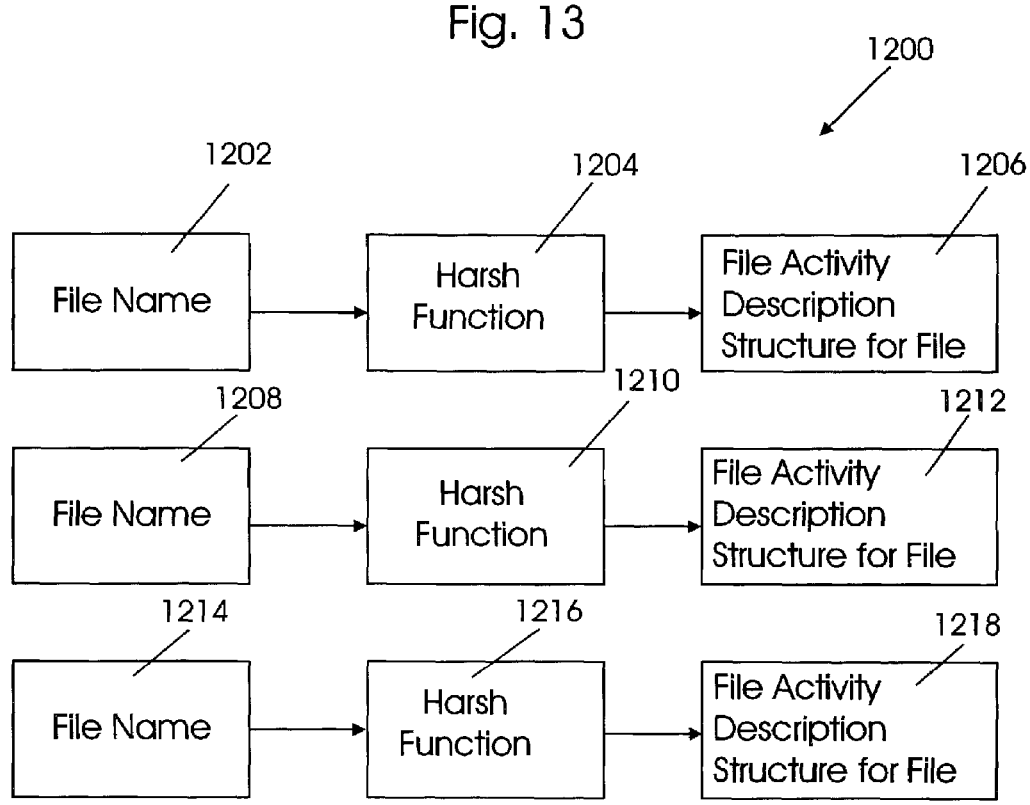
FIG. 13 shows a hash table called a modified files hash table.

The analysis process 902 begins with step 1104 where the analysis process browses the whole of the file system monitor log 22 to form a hash table for monitored files, such as table 1200 shown in FIG. 13. The process of forming a modified files hash table from a file system monitor log 22 is described with reference to FIG. 15. At step 1106, the analysis process 902 interprets the modified file hash table 1200 shown in FIG. 13 to come up with a modified list, rename list and delete list. This process is described in more detail in FIG. 20. The modified list has the names of the files that have been modified since the last synchronization, The rename list has the names of the files that have been renamed since the last synchronization. The delete list has the names of the files that have been deleted since the last synchronization. Step 1106 tries to understand the semantics of the modified files hash table 1200 to come up with three lists—files modified in the source, files renamed in the source and files deleted in the source.

FIG. 13 shows a modified files hash table 1200. The modified files hash table 1200 includes file names 1202, 1208, and 1214, hash functions 1204, 1210, and 1216 and file activity description structure for files 1206, 1212, and 1218. Hash functions 1204, 1210, and 1216 is in fact, the same hash function. Lookup and retrieval is really fast if a hashing technique is used. If the key for the hash table and the hash function is known, then using the two it is possible to arrive at where a data structure (in this case file activity description structure 1206, 1212 and 1218) is stored. Please note that it is faster to use the hashing technique in this case. But the results can be obtained by using an array or a linked list also.

When we are trying to decipher all the requests logged in the file system monitor log 22, the end result should be the list of files modified or deleted or modified. But the same file might have more than one operation logged in the file system monitor log 22. For example, one file may have 3 modifies logged followed by a delete. In this case, we add this file to the delete list as in this session, the only operation that is applicable is delete. Another file may have only 3 modifies logged. In this case, we add only one entry to the list of files modified. To understand what is the operation we have to do ultimately which is termed as optimized relevant operation, analysis process takes the help of a hash table called modified files hash table 1200 which is typically comprised of file names as the index and their respective information stored in file activity description structures. In FIG. 13, 1204 is a hash function and the file name is the key. Using these hash function 1204 and the file name for the key the analysis process can retrieve where the file activity description structure for a file should be stored or is stored. File activity description structure is expected to have all the relevant operations that have happened to this file since the last synchronization. The process of adding information to file activity description structure is described in FIG. 15, which is the step 1104 in FIG. 12.

Figure 14:
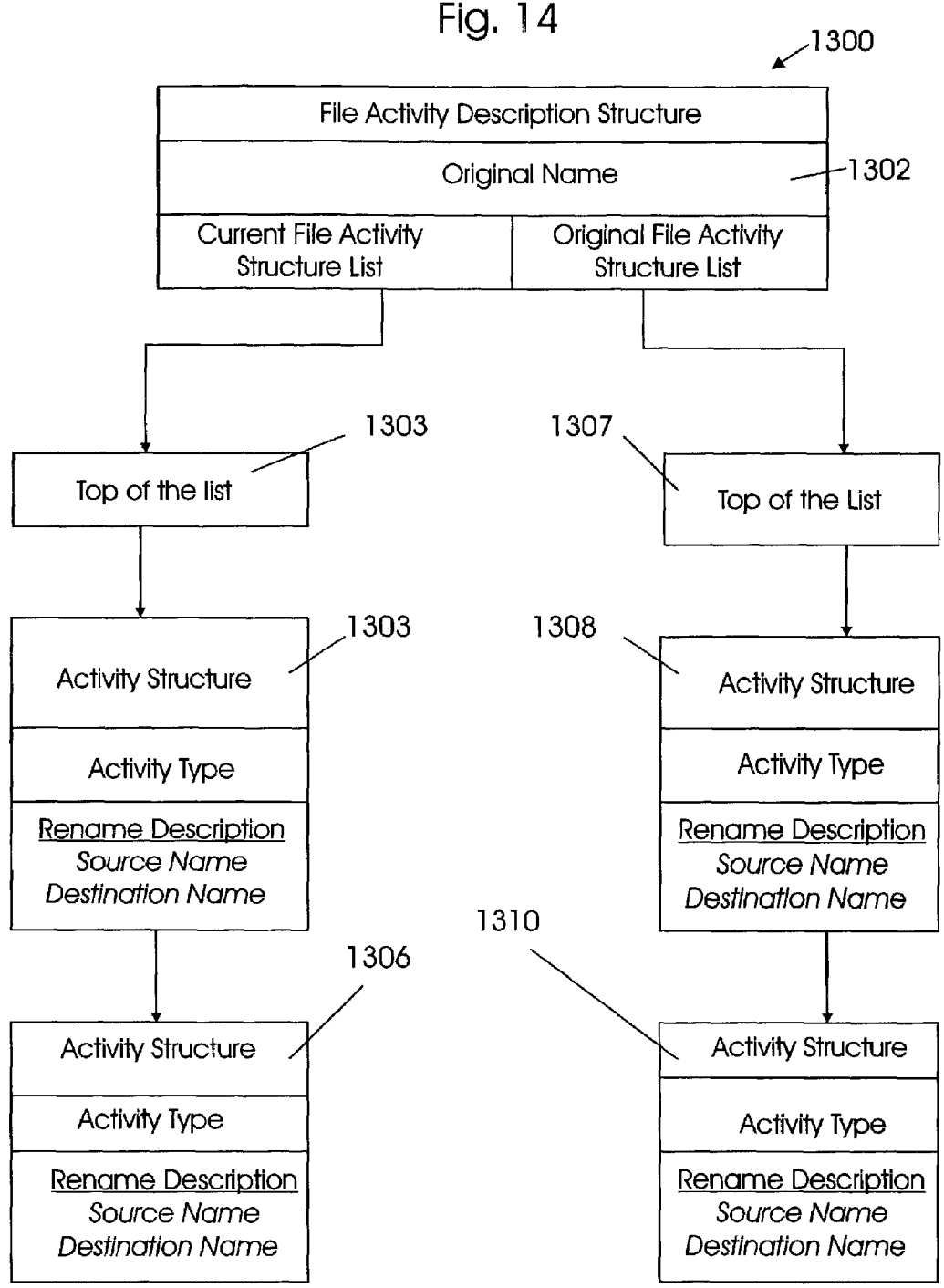
FIG. 14 shows the file activity description structure overview which contains a list of activity structure within it called file activity structure list.
Figure 15:
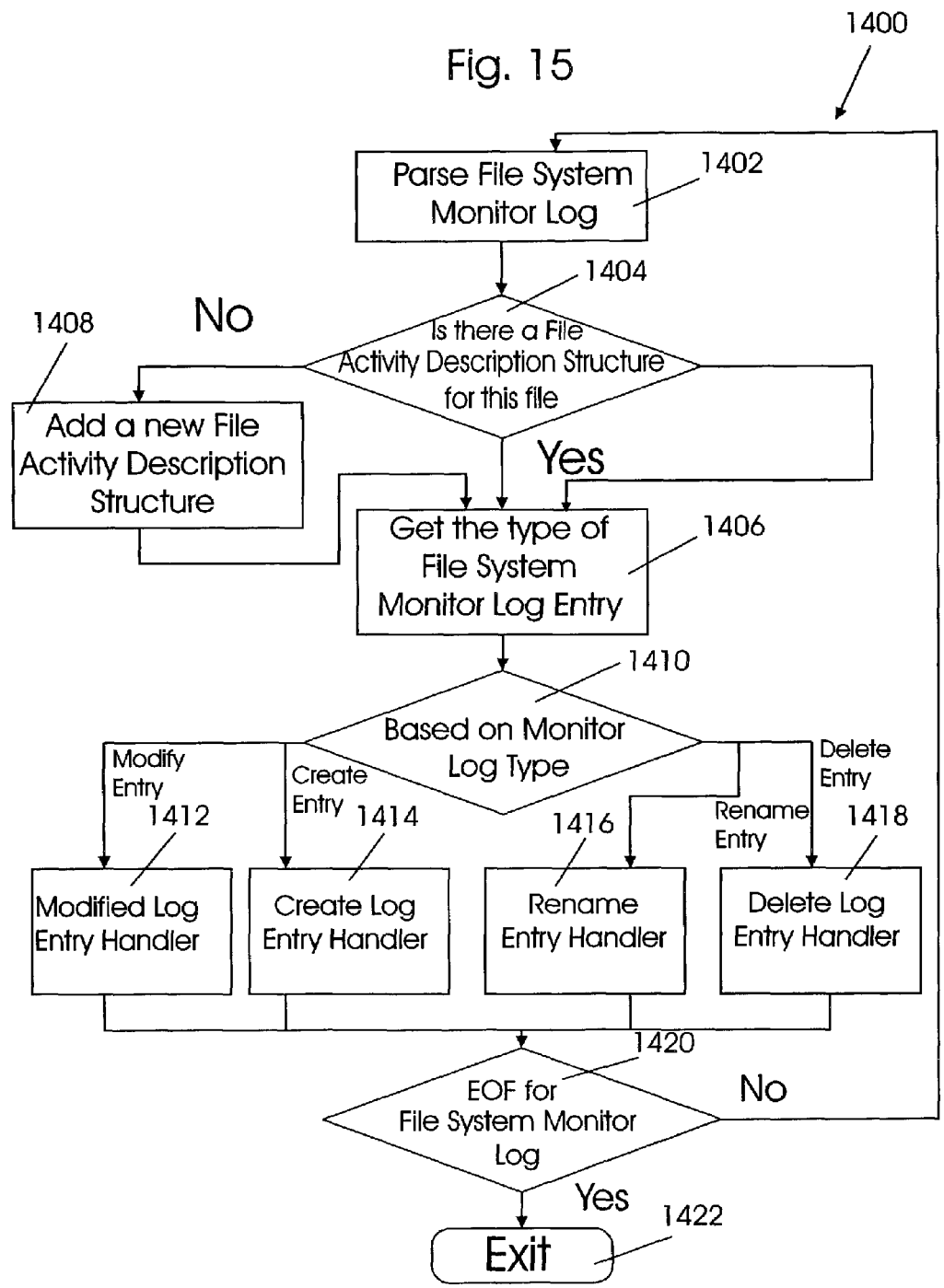
FIG. 15 shows a flow chart of a method that the file system request monitor uses to fill the modified files hash table of FIG. 13 from the file system monitor log.

FIG. 14 shows the file activity description structure overview, which contains two lists of activity structures within it called file activity structure list. The file system monitor log 22 is parsed and for each entry of File System Monitor Log 22. the following steps are taken. Every entry in the file system monitor log 22 represents an action that is to be replicated from source to the destination. There is a file name for every entry in the file system monitor log 22 for which this action is to be replicated. It is determined by the analysis process whether there is already an entry for this file name in the modified files hash table 1200 of FIG. 13 for the entry in the file system monitor log 22 just read. If there is no entry for this file name, then a new hash table entry for table 1200 is created. The file name 1202 is the hash index. Using the hash function 1204 we get the object that we call file activity description structure 1206. (FIG. 13). The structure 1206 summarizes a series of actions that have happened to the file with file name 1202. When a new file activity description structure is initialized, original name field is initialized to the name of the file. There are chances that this file may be renamed subsequently. It is the original name field that contains the first name of the file even if there has been a series of renames to this file. Each action resides as a node in a list pointed to by either current file activity structure list or original file activity structure list shown in 1302 in diagram 1300 of FIG. 14. These two lists are generically termed as file activity structure list. Current file activity structure list for a file file1.doc contains all the actions on the current file1.doc along with the top of the list node 1303. Original file activity structure list for the file file1.doc contains all the actions for the file that was originally file1.doc since the last synchronization along with the top of the list node 1307. Therefore, if original file1.doc was never renamed, the two file activity structure lists are identical. Each node in the file activity structure list is of the type activity structure 1304 other than the top of the list node (1303 and 1307). Therefore if a file1.doc is modified and then deleted, there will be only one entry for file1.doc in the modified files hash table 1200 of FIG. 13. Its File activity description structure, such as structure 1206, can be obtained from applying the hash function, for example hash function 1204, to the name, for example, 1202, of the file. The file activity description structures, such as 1206, 1212, and 1218, will have a current file activity structure list element that will point to two nodes of the type activity structure in the above example for file1.doc other than the top of the list node. The first will have the activity type as MODIFIED LOG ENTRY and the second will have the activity type as DELETE LOG ENTRY. In both these nodes, the fields of rename description structure are unused. These are only used by rename. The file activity description structure 1206 is described in FIG. 14. In this example, original file activity structure list also points to the same list as current file structure list. Let us take another case where file2.doc is renamed to file3.doc. In this case, analysis process adds a modified hash table entry for file2.doc. Analysis process initializes the file activity description structure 1302 for file2.doc and sets it current file activity structure list to NULL. It sets a list of activity structure with only one node for rename from file2.doc to file3.doc other than the top of the list entry. This list will be pointed to by original file activity structure list for file2.doc. Original name field of the file activity description structure file2.doc also contains the value "file2.doc". At the same time, a modified file hash table entry is made for file3.doc. Its file activity description structure is initialized. Its original file activity structure list is set to the same list pointed to by original file activity structure list of file2.doc. The current file activity structure list also points to the same list pointed to by original file activity structure list of file2.doc. Original name field of file3.doc contains the file name "file2.doc". The file activity description structure 1206 stores a file name and a link list of activities called file activity structure list. Every activity structure in current file activity structure list represents some file activity from file system monitor log 22. For example if it is a delete entry in file system monitor log 22, activity type is stored as DELETE LOG ENTRY 1304 and RENAME DESCRIPTION STRUCTURE 1306 is ignored since it is used only for RENAME LOG ENTRY. If it is a rename entry, then activity type is stored as RENAME LOG ENTRY 1306 and RENAME DECRIPTION STRUCTURE 1304 is filled to store the source and destination names I.e. the old and the new name FIG. 15 shows a flow chart 1400 of a method that the analysis process 1102 of FIG. 12 uses to fill the modified files hash table 1200 of FIG. 13 from the file system monitor log 22 of FIG. 1. This is an elaboration of the step 1104 in FIG. 12. At step 1402 the file system monitor log 22 is parsed by the analysis process 1102 to read the first entry or the next entry from the file system monitor log 22. At step 1404, for each entry in the file system monitor log 22, the analysis process 1102 determines if there is already a file activity description structure, like the structure in FIG. 14, for the file in the modified files hash table. In case of renames, we do search in modified files hash table for the original name (source file). If there is not any file activity description structure for this particular file, a file activity description structure is added to the modified file hash table. The original name entry in the new file activity description structure is set to the file name in the entry just read in the file system monitor log 22. In renames, the original name entry in file activity description structure 1202 is set to the original name (old name) of rename. The activity structure list is initialized and both original file activity structure list and current file activity structure list are made to point to this list. In any case, after ensuring there is a modified files hash table entry and a corresponding file activity description structure for this file, step 1406 is executed and the analysis process 1102 gets the type of file system monitor log entry from the file system monitor log 22. At step 1410 based on the monitor log type the analysis process 1102 modifies the modified file hash table to add a activity structure of the type MODIFIED LOG ENTRY, CREATED LOG ENTRY, RENAME LOG ENTRY or DELETE LOG through steps 1412 (detailed in FIG. 16), 1414 (detailed in FIG. 17), 1416 (detailed in FIG. 18), or 1418 (detailed in FIG. 19) respectively. After one of these steps is executed, at step 1420, the analysis process 1102 determines if it has reached the end of file (EOF) to the file system monitor log 22. If not, then the procedure loops back to step 1402 and repeats for the next entry in the file system monitor log 22. If an EOF has been reached in the file system monitor log 22, then the procedure is exited at step 1422.

Figure 16:
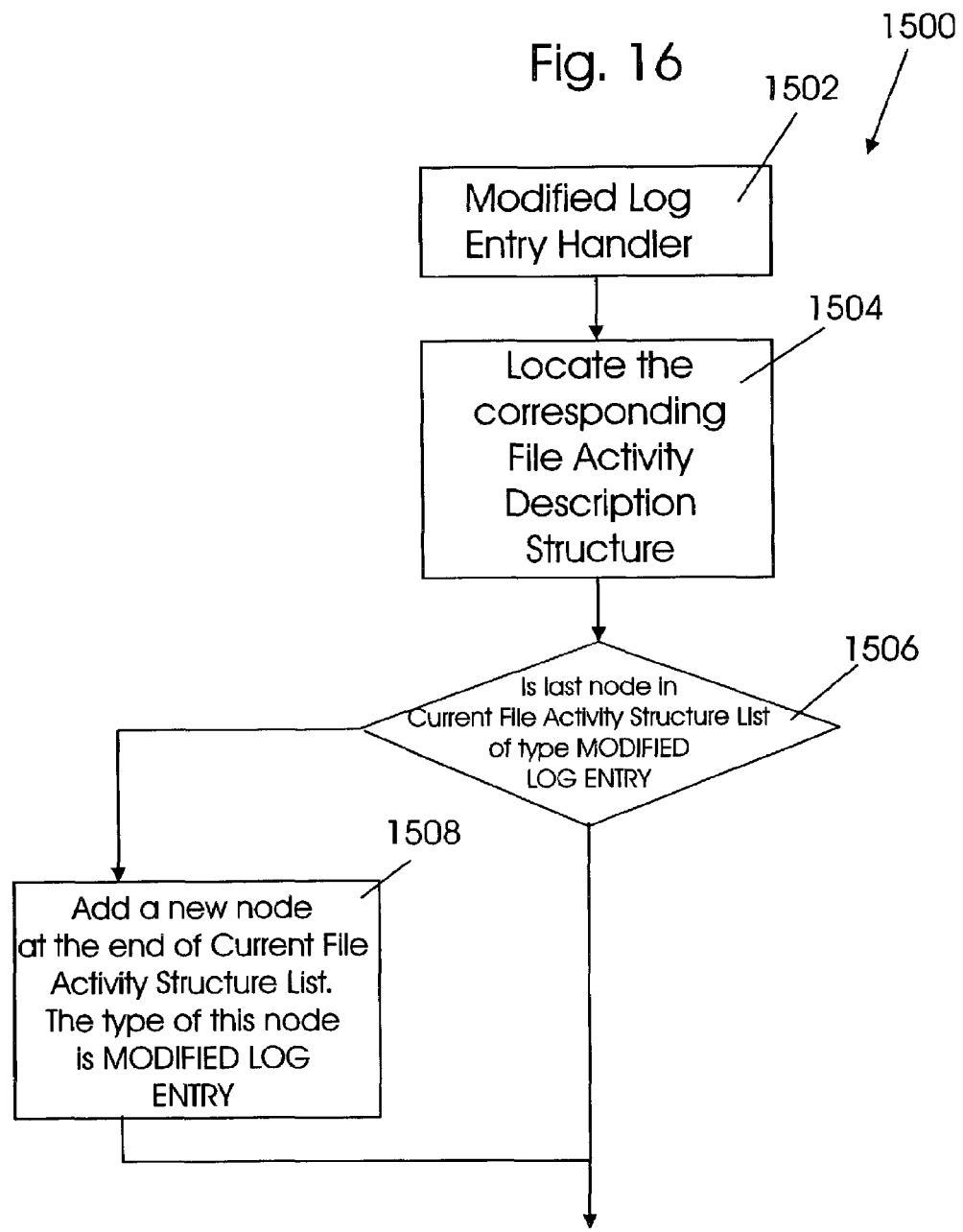
FIG. 16 shows a flow chart of a method that the file system request monitor uses to add a modified entry from the file system monitor log to the modified files hash table of FIG. 13.

FIG. 16 shows a flow chart 1500 of a method that the file system request monitor 30 uses to add modified log entry from the file system monitor log 22 to the modified files hash table 1200 of FIG. 13. At step 1504 the file system request monitor 30 locates the corresponding file activity description structure in the modified files hash table for the file name in the file system monitor log entry. From that, current file activity structure list is obtained. If the last entry in the current file activity structure list is already a MODIFIED LOG ENTRY, no further action is taken and we go to step 1420. Refer to FIG. 14 which describes how each file in file system monitor log 22 has a file activity description structure in the modified files hash table 1200 and all the significant activities that has happened on this file is stored in a linked list of activity structures called file activity structure list. At step 1508 the analysis process 1102 adds to the end of the current file activity structure list for this file in the file system monitor list 24 a new MODIFIED LOG ENTRY. Every node in current file activity structure list other than top of the list is of the type activity structure. Its activity type is set as modified log entry.

Figure 17:
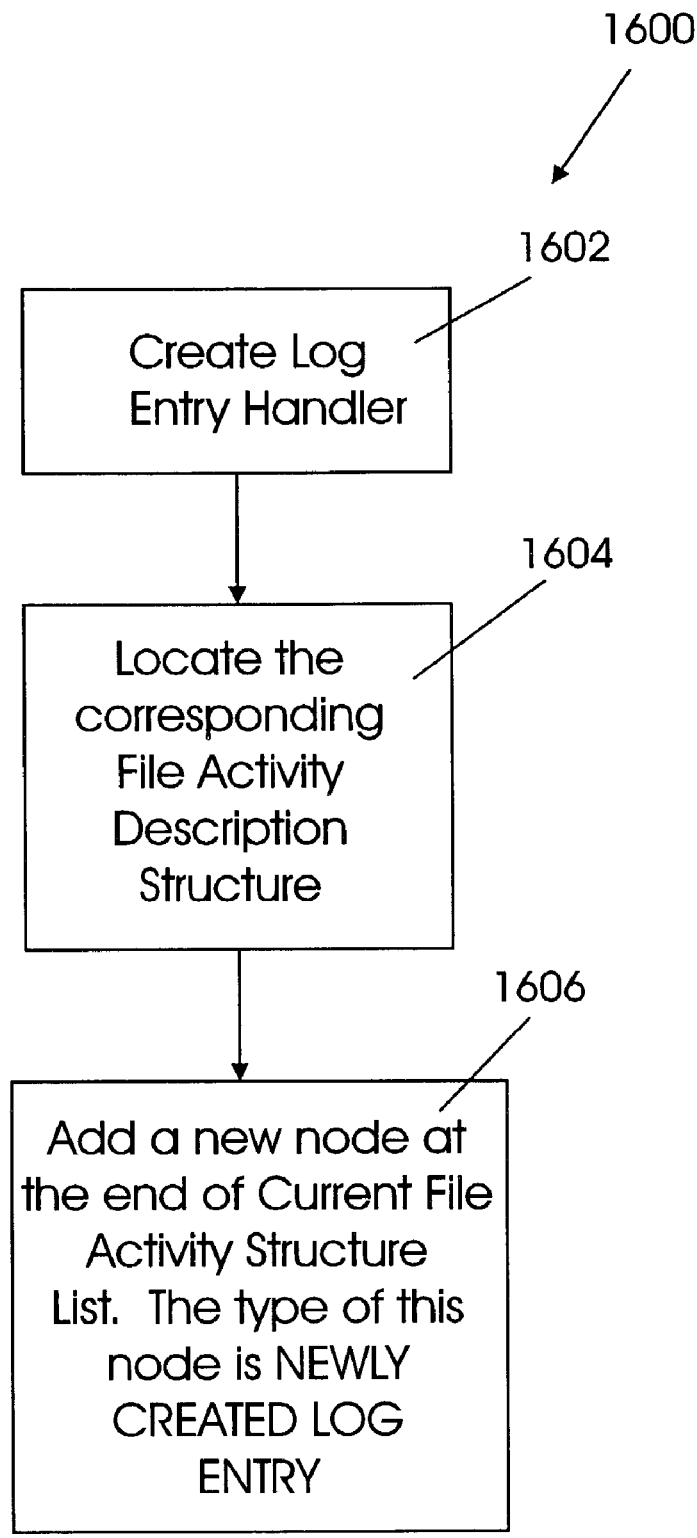
FIG. 17 shows a flow chart of a method that the file system request monitor uses to add a create entry in the file system monitor log to the modified files hash table of FIG. 13.

FIG. 17 shows a flow chart 1600 of a method that the analysis process 1102 uses to add a newly created entry in the file system monitor log 22 to the modified files hash table 1200 of FIG. 13. The create log entry procedure begins at step 1602. At step 1604, the analysis process 1102 locates the corresponding file activity description structure in the modified files hash table. From that, current file activity structure list is obtained. At step 1606, the analysis process 1102 adds a new node at the end of the current file activity structure list in hash table 1200. The type of this node is a NEWLY CERATED LOG ENTRY.

Figure 18:
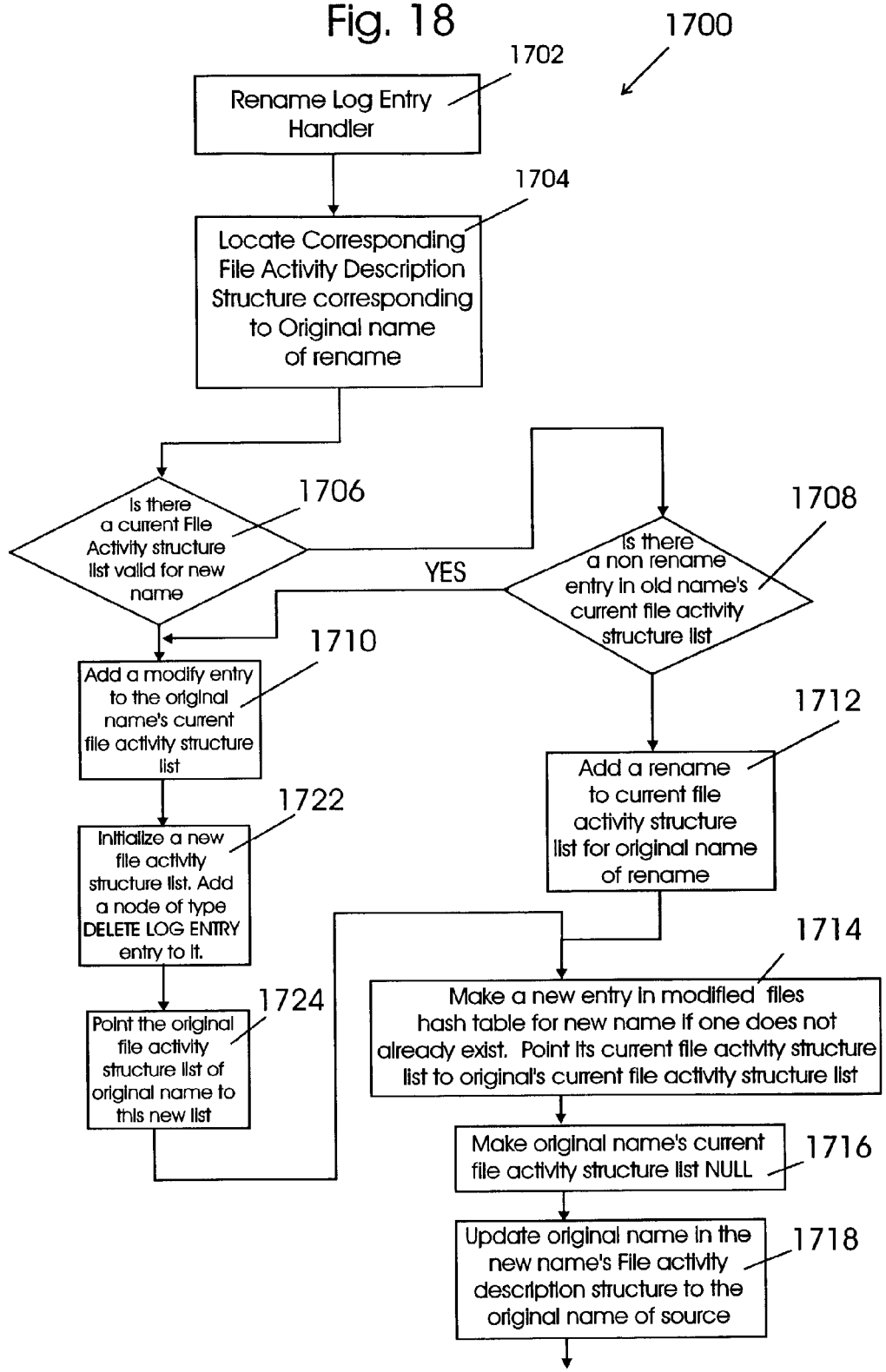
FIG. 18 shows a flow chart of a method that the file system request monitor uses to add a rename entry describes how a rename entry in the file system monitor log to the modified files hash table of FIG. 13.

FIG. 18 shows a flow chart 1700 of a method that the analysis process 1102 uses to add a rename entry in the file system monitor log 22 to the modified files hash table 1200 of FIG. 13. The procedure starts at step 1702. At step 1704 the analysis process 1102 locates the file activity description structure in the modified files hash table corresponding to the original file name. At step 1706 it is determined whether a file activity description structure exists already for this new name specified in the file system monitor log entry read in 1404 and whether it has a non NULL current file activity structure list. If not, then analysis process 1102 moves to step 1708. If yes, then analysis process moves to step 1710. At step 1708, it is determined if there is even a single node in the current file activity structure list not of the type RENAME LOG ENTRY other than the top of the list entry. If not, then analysis process 1102 moves to step 1712. If yes, then analysis process 1102 moves to step 1710. In step 1712, analysis process 1102 adds a new node of the type RENAME LOG ENTRY to the end of current file activity structure list. Subsequently, analysis process 1102 moves to step 1714.

In step 1710, analysis process 1102 adds a new node to the end of current file activity structure list of the type MODIFIED LOG ENTRY. Thereafter, analysis process 1202 moves to step 1722. In step 1722, a new file activity structure list is initialized. A new node is added to this list of the type DELETE LOG ENTRY. Subsequently in step 1724, analysis process 1102 point the original file activity structure list of original name of rename (old name) to this new file activity structure list. Thereafter, analysis process 1102 executes step 1714.

At step 1714, analysis process 1102 determines if there is already an entry for the new name of rename in the modified files hash table 1202. If there is none, a new entry is created for new name. Its file activity description structure 1302 is initialized. Its file activity structure lists are initialized to the same value which is to the original file's (old name's) current file activity structure list. If file activity description structure 1302 already exists, file activity structure lists are not initialized in this case. Only the current file activity structure lists is initialized to original file's (old name's) current file activity structure list.

In the next step 1716, analysis process 1102 makes original name's (old name's) current file activity structure list as NULL. This implies that there is no file currently with that name. Then in step 1718, analysis process 1102 updates the original name in the new name's file activity description structure to the original name of file activity description structure of old file name. On completion of this step, analysis process 1102 moves over to step 1420 of FIG. 15.

Figure 19:
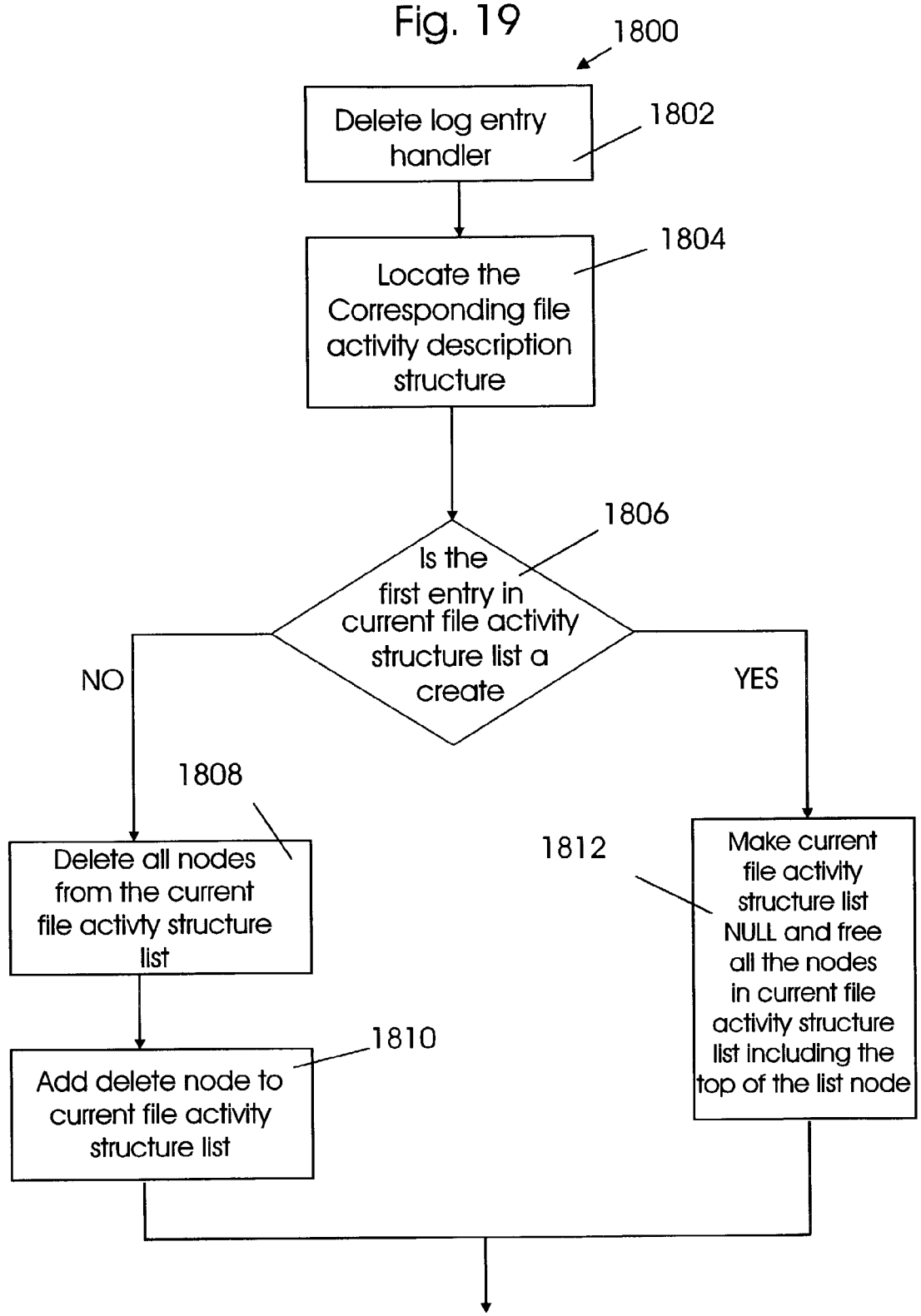
FIG. 19 shows a flow chart of a method that the file system request monitor uses to add a delete entry from the file system monitor log to the modified files hash Table of FIG. 13.

FIG. 19 shows a flow chart 1800 of a method that the analysis process 1102 uses to add a delete entry from the file system monitor log 22 to the modified files hash table 1200 of FIG. 13. The procedure of FIG. 19 begins at step 1802. At step 1804 the analysis process 1102 locates the file activity description structure corresponding to the file in the file system monitor log entry. Step 1408 ensures there is a file activity description structure/modified files hash table entry for this file. At step 1806, the analysis process 1102 determines if the first node in the current file activity structure list is a create call. If yes, step 1812 free all the entries of current file activity structure list including top of the list node. Step 1812 of the analysis process 1102 ensures that the value of current file activity list to NULL. The step 1812 ensures that temporary files are not considered for being deleted. In this step 1812, the original name of this file activity description structure 1302 is obtained. Corresponding to this name (original name), using the modified file hash table 1202, analysis process 1102 finds the file activity description structure 1302. Analysis process 1102 sets the corresponding original file activity structure list to NULL also after freeing all the nodes of this list. On completion of this step, analysis process 1102 moves over to step 1420 of FIG. 15. If in step 1102, it is determined that the first node is not a create call, then the next step is 1808. At step 1808 the analysis process 1102 deletes all nodes in the current file activity structure list for this file other than the top of the list entry. If the current file activity structure list is empty, then there is nothing to delete. At step 1810, the analysis process 1102 adds a new node at the end of the current file activity structure list. This new node is a delete log entry type node. This is because typically a delete takes precedence over all other actions. This is because, if there was a modify done to a file followed by a delete, ultimately the file was deleted and the effect of the earlier modify is nullified by the delete action. On completion of this step, analysis process 1102 moves over to step 1420 of FIG. 15.

Figure 20:
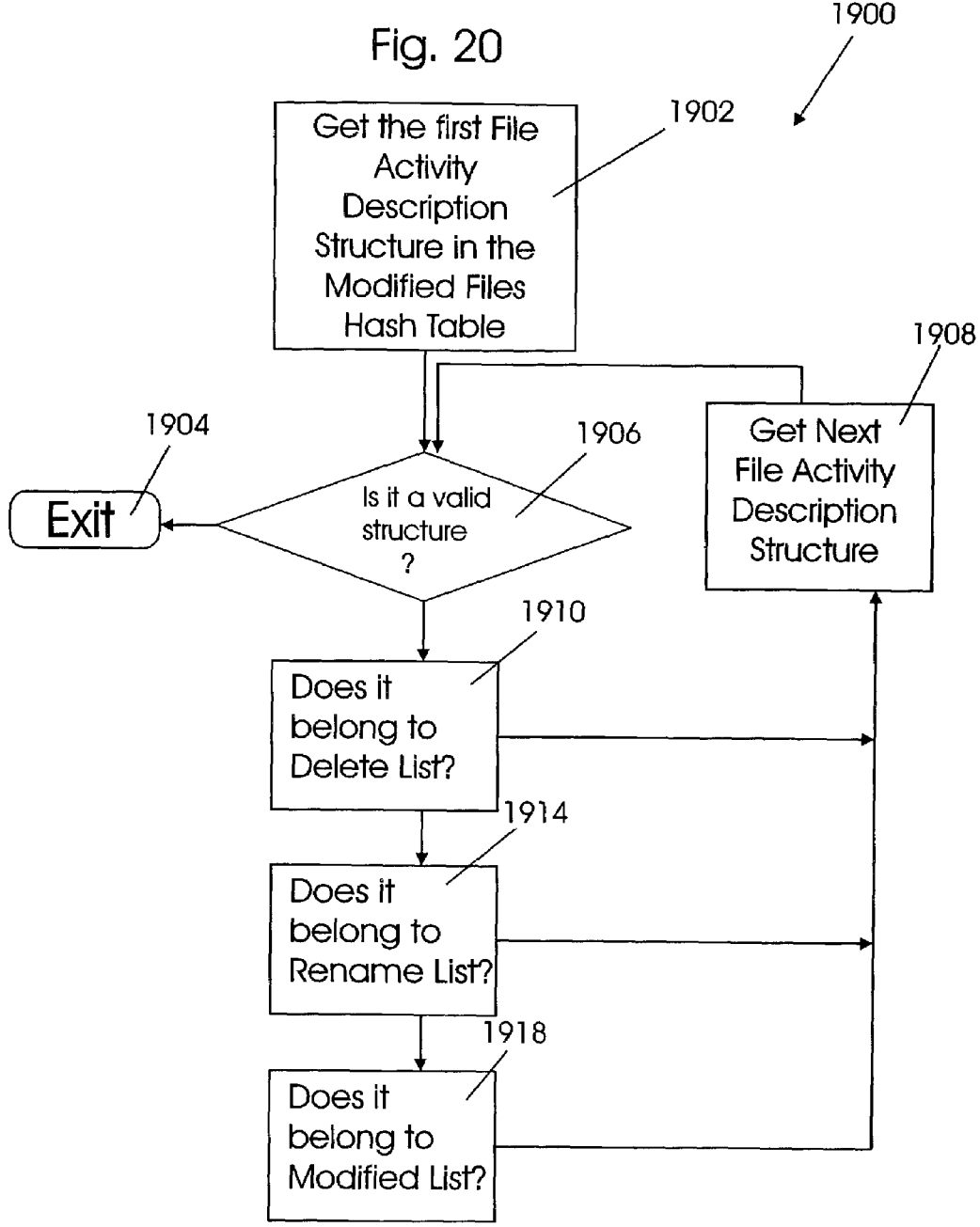
FIG. 20 shows a flow chart of a method that the file system request monitor uses to parse the modified files hash table of FIG. 13 to form a list of files modified at a source, a list of files renamed at the source, and a list of files deleted at the source.

FIG. 20 shows a flow chart 1900 of a method that the analysis process 1102 uses to parse the modified files hash table 1200 of FIG. 13 to form a list of files modified at a source, a list of files renamed at the source, and a list of files deleted at the source. These three lists will also be called analysis lists and will be stored in the memory of the analysis process. FIG. 20 is a detailed description of the step 1106 in FIG. 12.

At step 1902 the analysis process 1102 gets the first file activity description structure in a modified files hash table, such as table 1200 in FIG. 13. At step 1906 the analysis process 1102 determines if this first file activity description structure is a valid structure and are there more members in the list to process. If not, then the procedure is exited at step 1904. If this is a valid structure the analysis process 1102 next determines if the file activity description structure belongs to the delete list, the rename list, or the modified list, at steps 1910, 1914, and 1918 respectively. If the first file activity description structure belongs to one of the delete list, rename list, or the modified list, then it will be added to the appropriate list of files deleted, renamed, or modified. The analysis process 1102 gets the next file activity description structure at step 1908 following any one of steps 1910, 1914 and 1918 and the method loops back to step 1906.

Each item in the modified files hash table 1200 in the file system monitor list 24 is looked up by the analysis process 1102. If the analysis process 1102 determines that an item belongs to the delete list, then the item is added to the list of files deleted at the source, stored in the analysis process 902. It goes to the next element of modified files hash table. FIG. 20 tries to show this process. There are lots of entries in the modified files hash table 1200. 1902 get the first entry in the modified files hash table 1200. As shown in FIG. 13, the modified files hash table 1200 gets the corresponding file activity description structure. Depending on the situation it is added to a modified list, rename list or deleted list. Then step 1908 gets the next member in the modified files hash table 1200 and gets the file activity description structure before going to step 1906.

Figure 21:
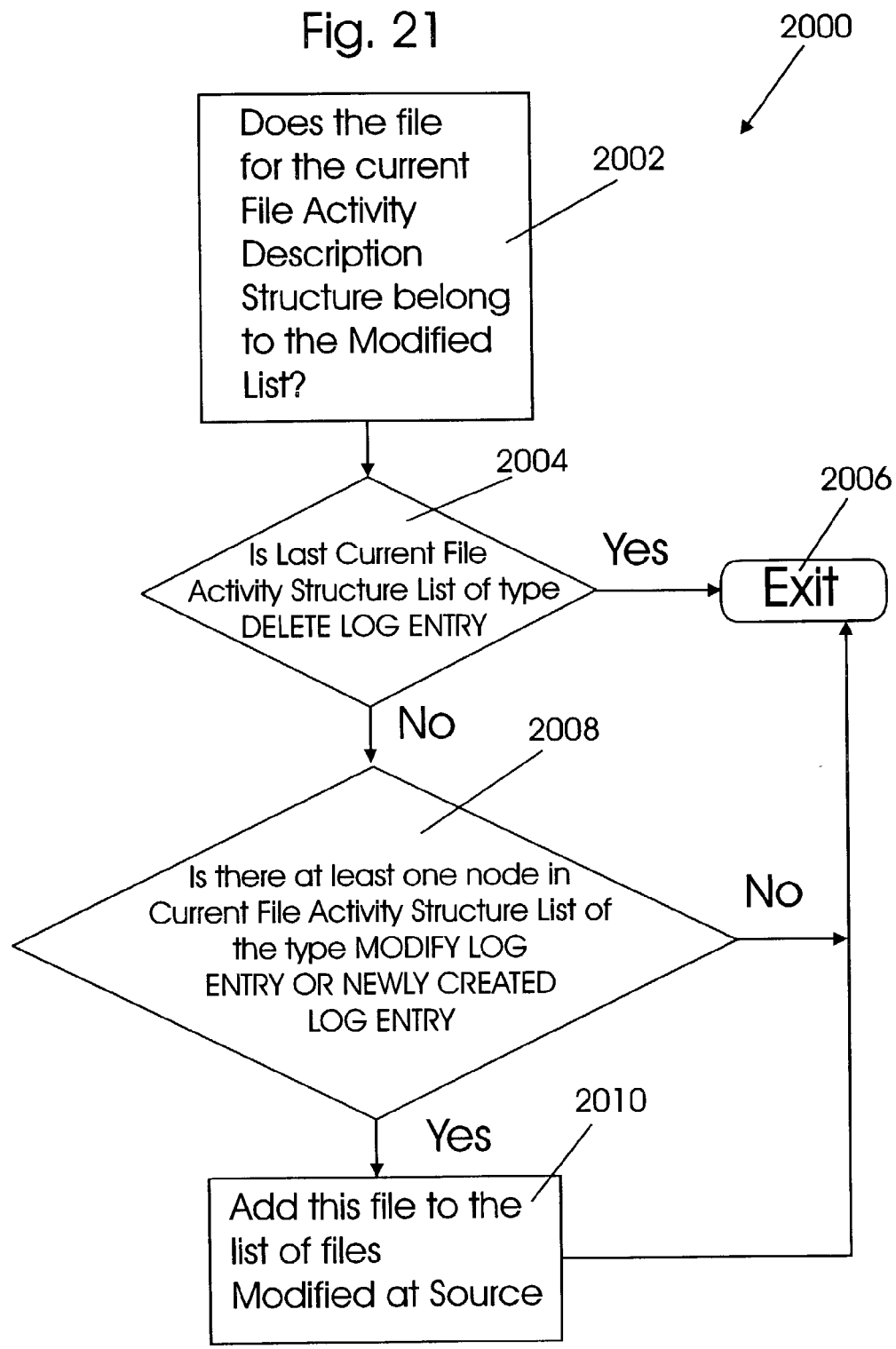
FIG. 21 shows a flow chart of a method that the file system request monitor uses to parse the modified files hash table of FIG. 13 to form the list of files modified at the source.

FIG. 21 shows a flow chart 2000 of a method that the analysis process 1102 uses to parse the modified files hash table 1200 of FIG. 13 to add a file to the list of files modified at the source. The function entry is at step 2002. At step 2004, the analysis process 1102 determines if the last file activity structure was of the type "delete log entry". If yes, then the procedure is exited at step 2006. If no, then at step 2008 the analysis process 1102 determines if there is at least one node in the current file activity structure list of the type "modify log entry or newly created log entry". If not, then the procedure is exited at step 2006. If yes, then the file in the current file system request is added to the list of files modified at the source or client computer 10 at step 2010

Figure 22:
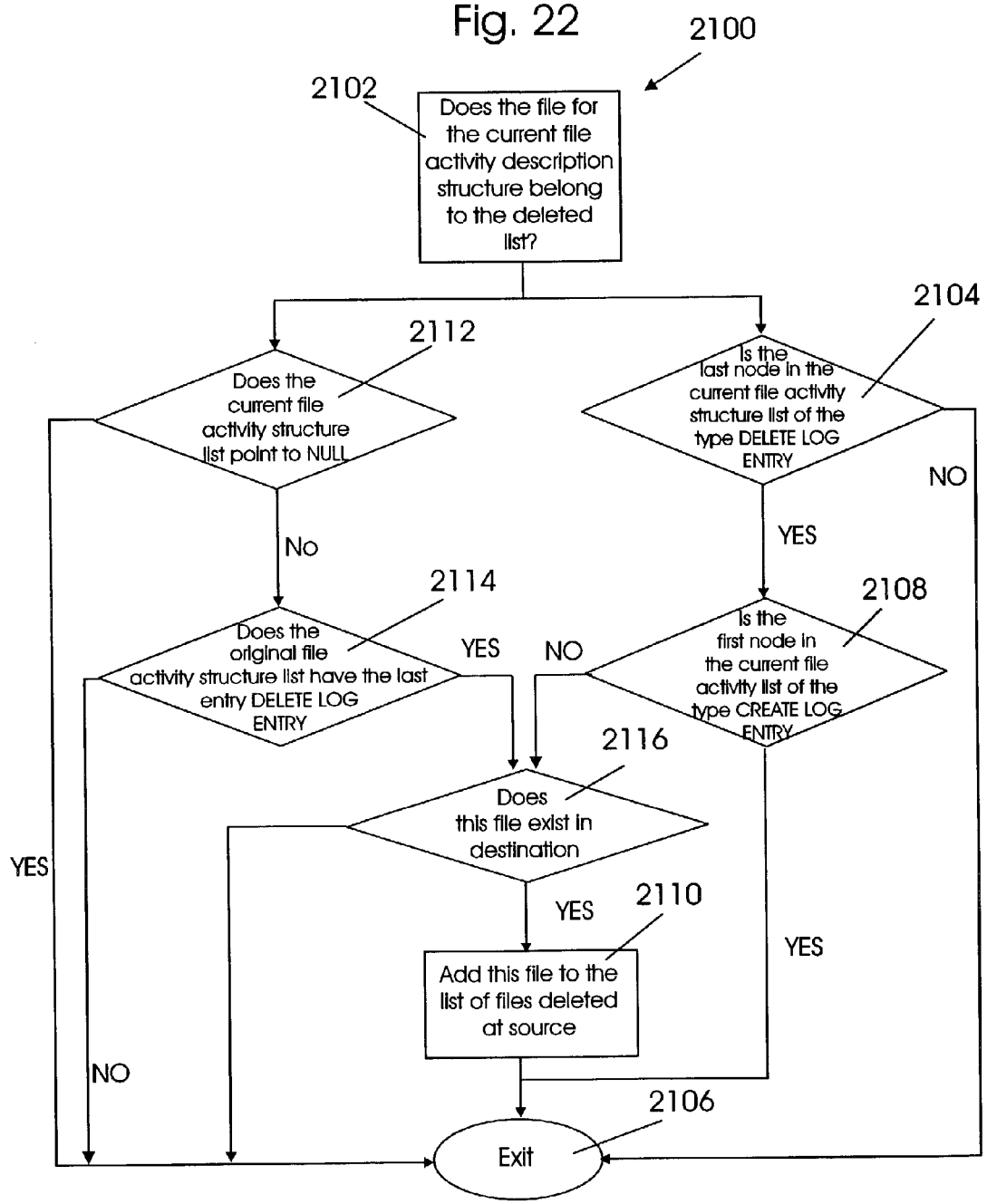
FIG. 22 shows a flow chart of a method that the file system request monitor uses to parse the modified files hash table of FIG. 13 to form the list of files deleted at the source.

FIG. 22 shows how the analysis process 1102 parses the modified files hash table 1200 to add a file to the delete list to be stored in analysis process 1102.

Step 2102 is the function entry point. At step 2104 it is determined whether the last current file activity structure list is of the type "delete log entry". If not, then the procedure is exited at step 2106. If yes, then the analysis process 1102 determines if the first node in the current file activity structure list of the type "newly created log entry" in the step 2108. If not, then the next step is 2116. If yes, then the procedure is exited at step 2106. In step 2116, analysis process 1102 ensures whether this file exists in the destination. If it does not exist, then the procedure is exited at step 2106. If it exists, then the next step is 2110. In step 2110, analysis process 1102 adds the file name in the file system request to the list of files deleted at the source. The procedure is also exited at step 2106 following execution of step 2110.

Also at step 2112, analysis process 1102 determines if the current file activity structure list is empty (i.e. has the value NULL). If not, then the procedure is exited at step 2106. If yes, then it is determined, if the original file activity structure list for this file activity description structure 1302 has the last entry of the type DELETE LOG ENTRY. If not, then the procedure is exited at step 2106. If yes, then the next step is step 2116 where it is determined if the file exists in the source and it is added to the list of files deleted at source only if it exists at the source. The procedure is exited at step 2106 following this.

Figure 23:
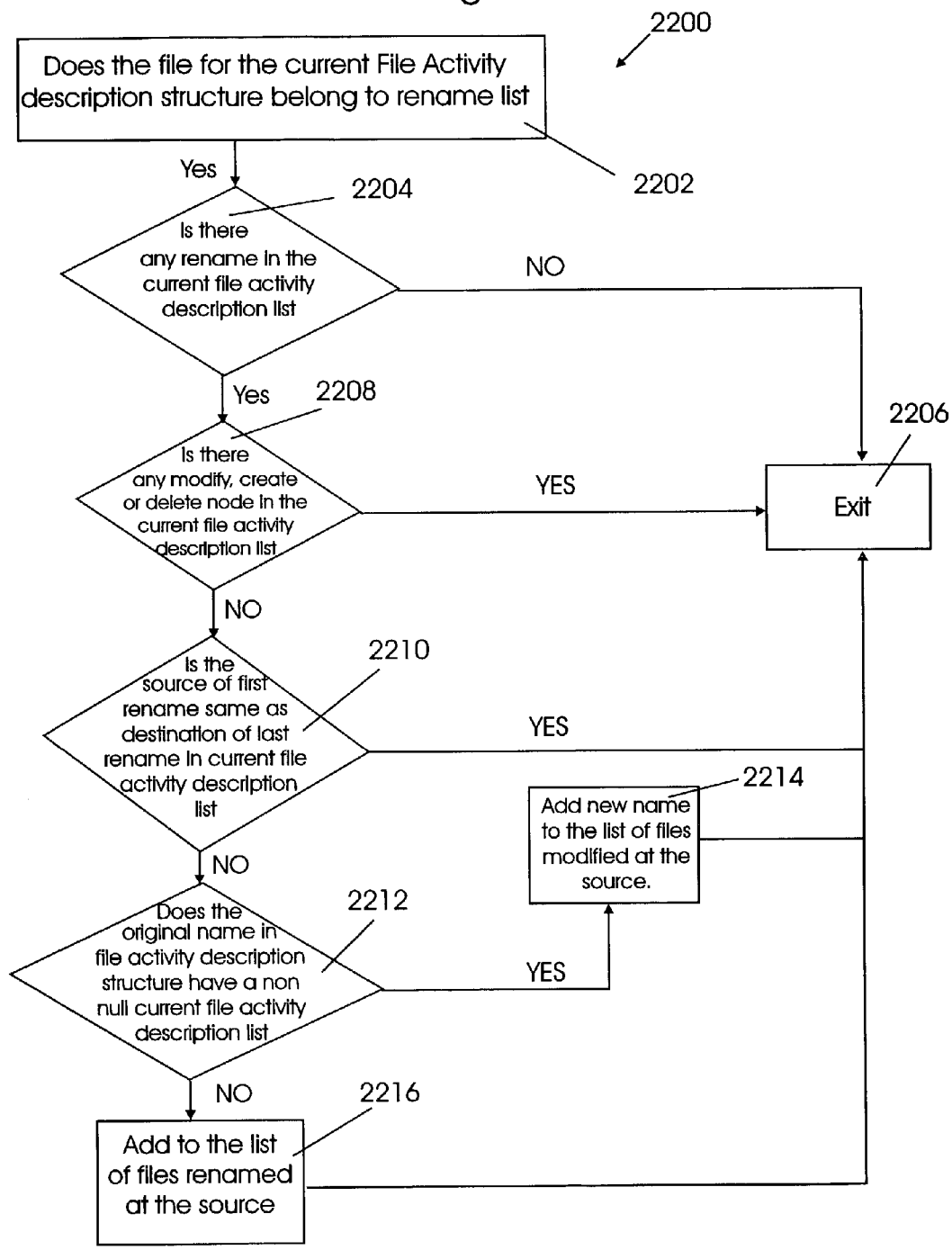
FIG. 23 shows a flow chart of a method that the file system request monitor uses to parse the modified files hash Table of FIG. 13 to form the list of files renamed at the source.

FIG. 23 shows a flow chart 2200 of a method that the analysis process 1102 uses to parse the modified files hash table 1200 of FIG. 13 to add a file to the list of files renamed at the source. FIG. 23 shows the details of how the analysis process 1102 determines if the file in the file system request is to be added to the list of files renamed at the source, which is located in the analysis process 1102

Step 2204 determines if the current file activity structure list for the file activity description structure has any node of the type RENAME LOG ENTRY. If not, then the procedure is exited at 2206. Even if there is one rename, analysis process 1102 goes to next step 2208. In step 2208, it is determined if there is even one node in the current file activity description list not of the type RENAME_LOG_ENTRY. If yes, then the process is exited at step 2206. If no, then the analysis process 1102 moves to the next step 2210. In step 2210, it is determined if the source of the first rename is same as destination of the last rename. If yes, the procedure is exited at step 2206. Otherwise, the analysis process 1102 moves to the step 2212. In step 2212, it is determined, if the original name in this file activity description structure has a modified file hash table entry and if there is, does it have a non null current file activity structure list (which is different from the current entry's current file activity list). If this is true, we move to step 2214 which adds the current file name to list of files modified at source. Subsequently, the process is exited at step 2206. If step 2212 returns false, we add the current file to the list of files renamed at source in step 2216. The original name is the source of first rename and the current name is the destination of the last rename (which is the current name) is the destination (new name) of the rename. After this, the process is exited at step 2206.

Figure 24:
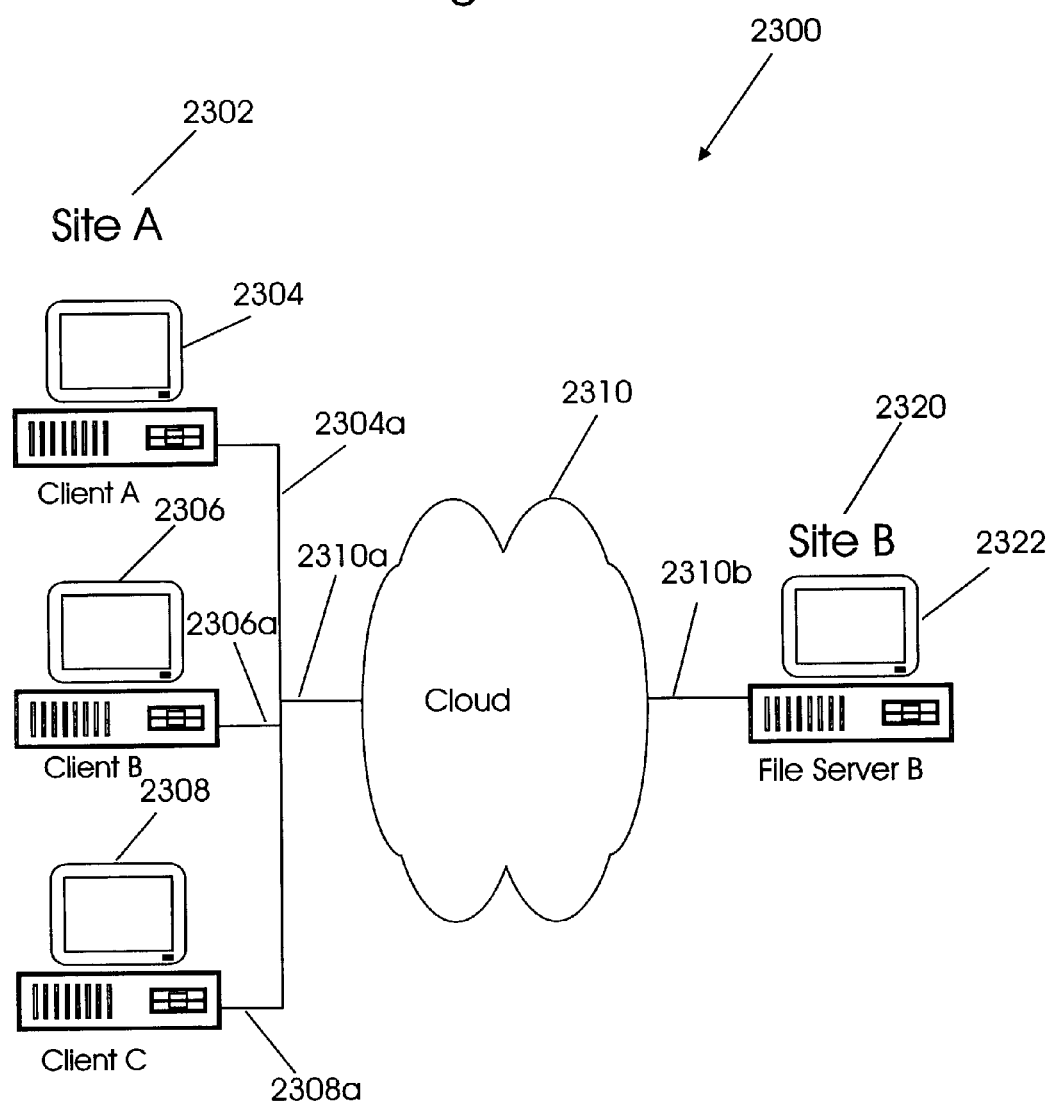
FIG. 24 shows a diagram of computer network configuration where [[[[site acceleration can be implemented.

FIG. 24 shows a diagram 2300 of computer network configuration where site acceleration can be implemented. The diagram 2300 shows site A or 2302 and site B or 2320 connected via the internet 2310. Three client computers 2304, 2306, and 2308 are located at site A or site 2302. Computer 2304 is electrically connected via communications links 2304a and 2310a to the internet 2310. Similarly computers 2306 and 2308 are electrically connected via communications links 2306a and 2310a and 2308a and 2310a to the internet 2310. A computer server 2322 located at site B is electrically connected to the internet 2310 through communications link 2310b. Whenever a client 2304, 2306 or 2308 has to read a file located in File Server B, all the read operations have to go through the slow connection 2310. This would imply that the access times would be very slow.

FIG. 24 describes a typical scenario where site acceleration would be desired. The company in the example of FIG. 24 has sites—Site A and Site B. The client computers 2304, 2306, and 2308 in Site A try to access a file server 2320 located at Site B. Unfortunately, Site A and Site B are connected over a slow connection 2310. This makes the file accesses very slow.

Figure 25:
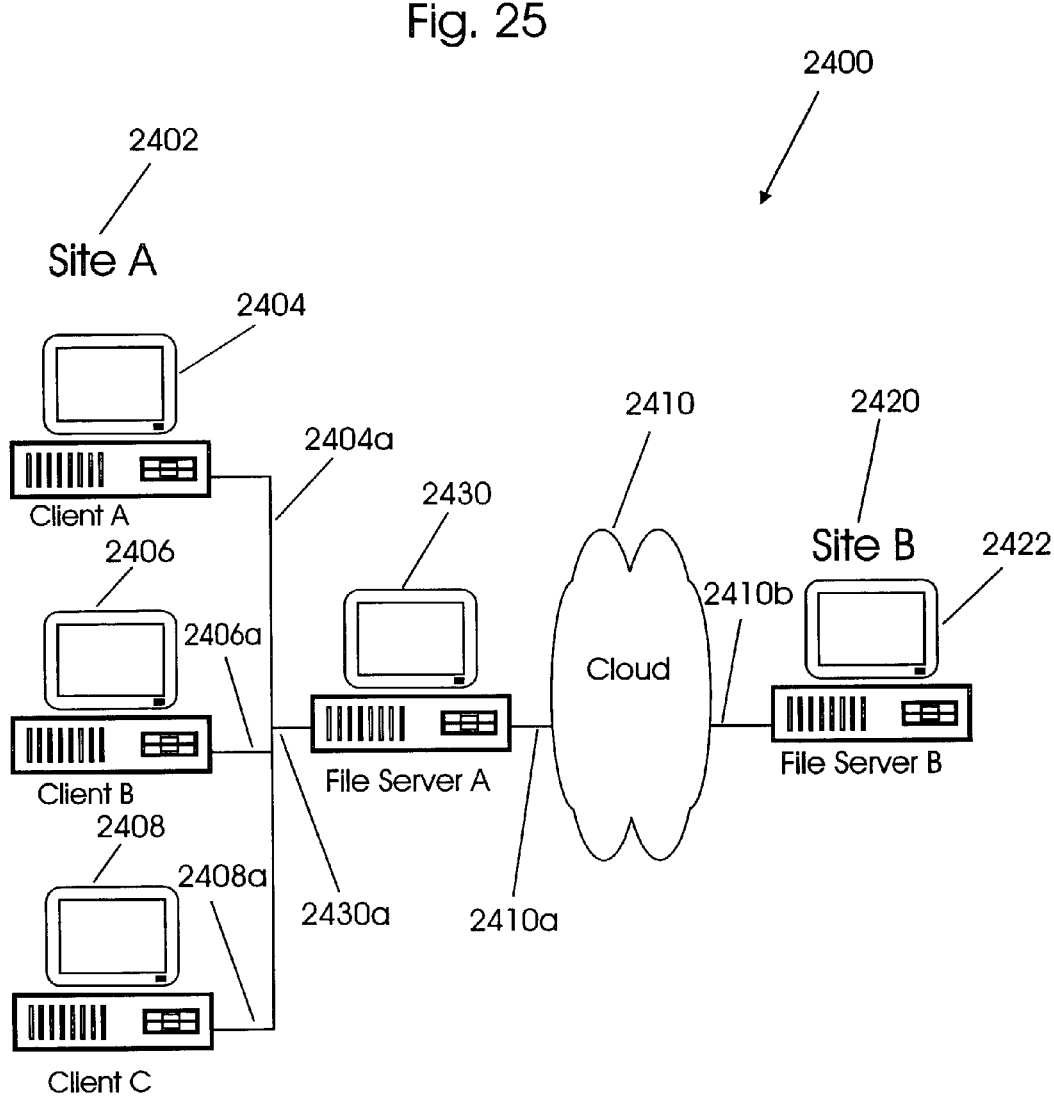
FIG. 25 shows a diagram of a second computer network configuration where site acceleration is implemented.

FIG. 25 shows a diagram 2400 of the scenario in FIG. 24 where site acceleration has been implemented. The diagram 2400 shows site A or 2402 and site B or 2420 connected via the internet 2410 and via a file server computer 2430. Three client computers 2404, 2406, and 2408 and the one file server computer 2430 are located at site A or site 2402. Computer 2404 is electrically connected via communications links 2404a and 2430a to the file server computer 2430. Similarly computers 2406 and 2408 are electrically connected via communications links 2406a and 2430a and 2408a and 2430a to the file server computer 2430. The file server computer 2430 is electrically connected to the internet 2410 via communications link 2410a. Communications links can be comprised of hardwired electrical connections, wireless communications links, or any other known communication or electrical connection. A computer server 2422 located at site B is electrically connected to the internet 2410 through communications link 2410b.

FIG. 25 provides a workaround for the problem referred to in FIG. 24 of slow accesses. An image of computer server 2422 located at site B is maintained in the computer server 2430 which is located at site A. All the users or client computers in site A, such as computers 2404, 2406, and 2408 access computer server 2430 at site A, instead of file server 2422 at site B. Computer server 2430 at site A is configured to do a real time optimized backup to computer server 2422 at site B. Therefore, file server A 2430 becomes the client computer 10 in FIG. 1. In this way all the changes done to files in computer server 2430 at site A are reflected on computer server 2422 at site B through real time optimized backup, keeping the two locations always synchronized.

Figure 26:
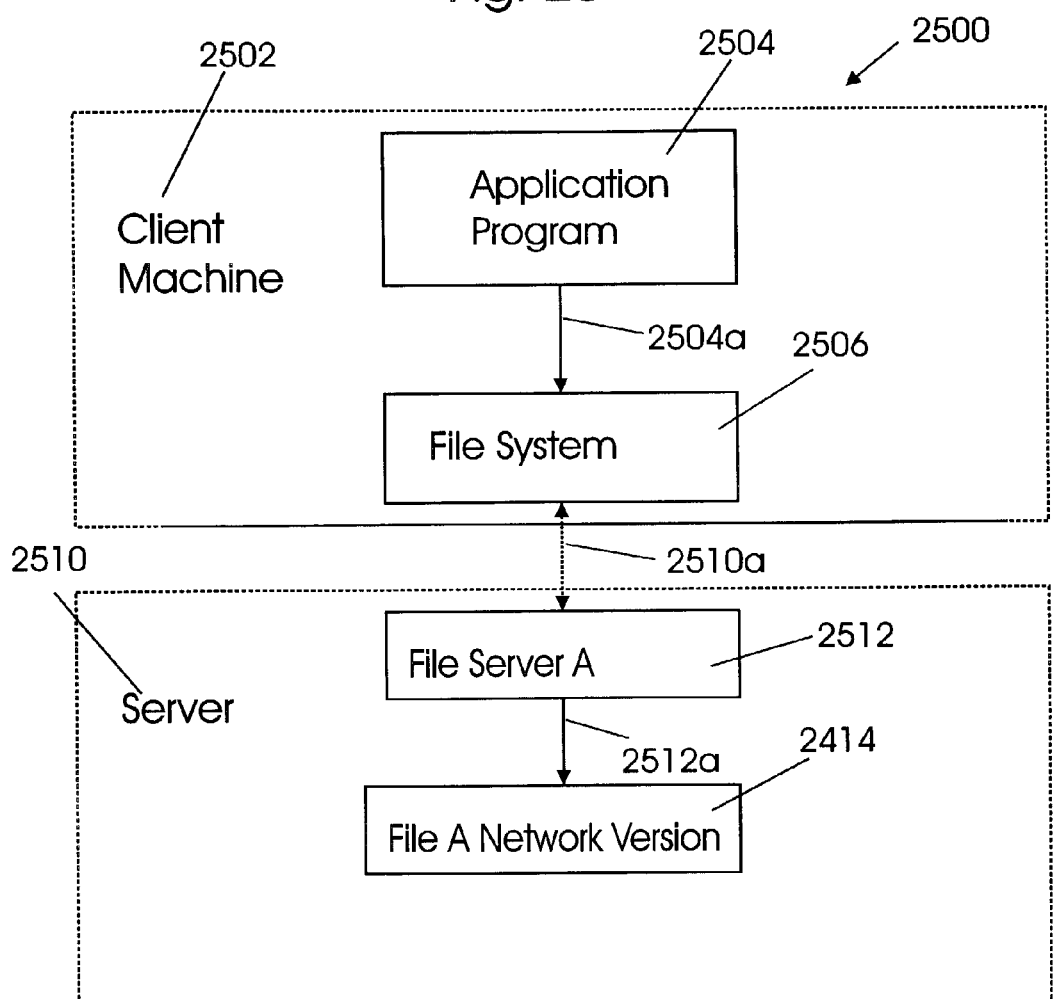
FIG. 26 shows a diagram of a client machine in communication with a server over a slow link.

FIG. 26 shows a diagram 2500 of a client computer 2502 in communication with a server computer 2510. FIG. 26 describes the scenario in which remote file access from a client is slow and therefore we would like to go for a client side acceleration described in FIG. 27. The client computer 2502 is comprised of an application program 2504 and a file system 2506. The application program 2504 and the file system 2506 are electrically connected together by communications link 2504a. The client computer 2502 is electrically connected to a server computer 2510 by communications link 2510a. The server computer 2510 includes a file server A 2512 and a file A network version 2514 which are electrically connected by communications link 2512a.

In FIG. 26, the application program 2504 is trying to access the network file 2514 located in computer server 2510. This call goes to the file system 28 which decides this as a network file and transfers this request over a network link 2510a to the file system of the computer file server 2510. From there, the file request is completed. Therefore, the buffers read and written have to go through this link. This makes the process of reading and writing a file very slow if the link 2510a is a slow link.

Figure 27:
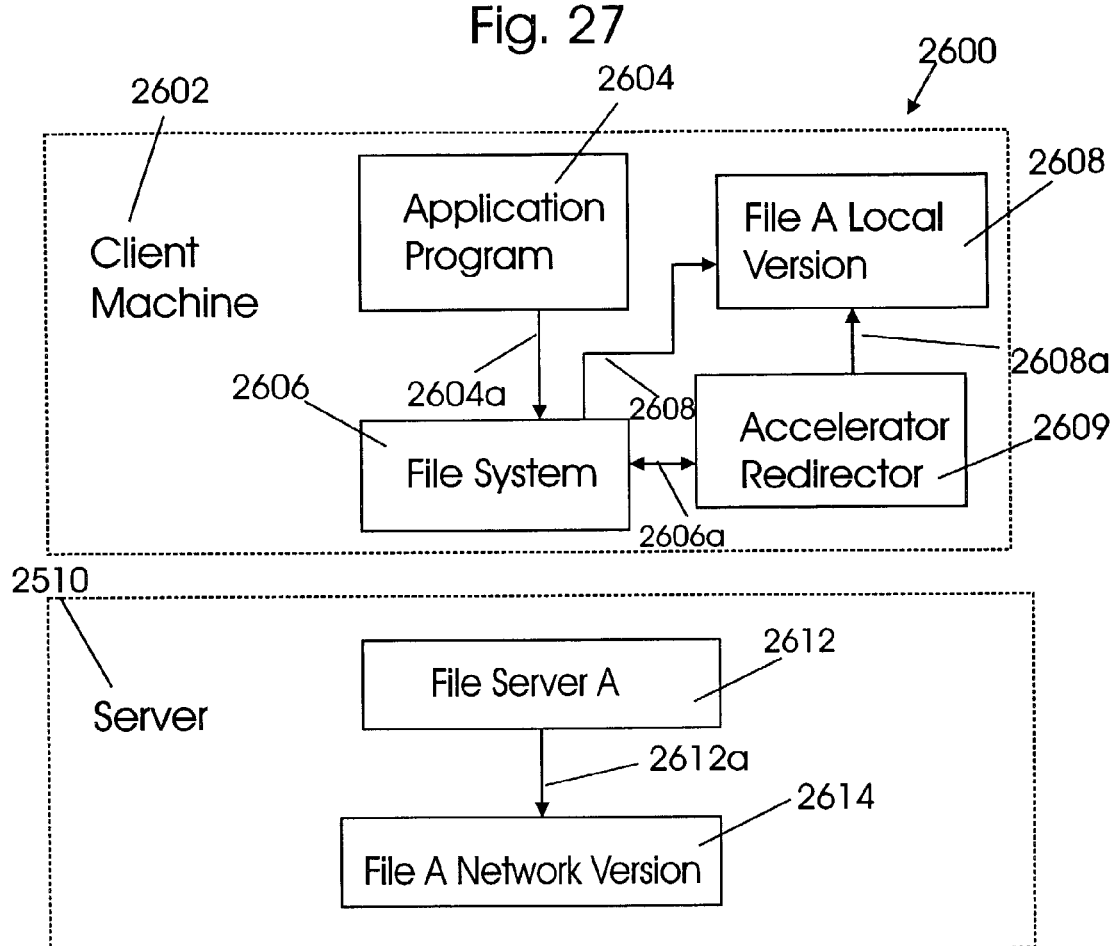
FIG. 27 shows a diagram of another client machine in communication with a server where client side acceleration is implemented.

FIG. 27 shows a diagram 2600 of a client computer 2602 in communication with the server computer 2510. The client computer 2602 includes application program 2504 linked to file system 2506 by communications link 2504a as in FIG. 26. However, client computer 2602 also includes file A local version 2608 and accelerator redirector 2609. File A local version 2608 is electrically connected to file system 2506 by communications link 2608a and to accelerator redirector 2609 by communications link 2608b. Accelerator redirector 2609 is electrically connected to file system 2506 by communications link 2609a.

FIG. 27 describes an alternative to FIG. 26 where the application program is trying to access a network file 2514 located in computer server 2510 which belongs to a destination of a local source of real time optimized backup. This call tries to make its way to the network file 2414. (2614 and 2414 are same). But before it can reach there, the accelerator redirector 2609 traps this call. It identifies the file name in this call as a file it has to further process since it belongs to the network destination of a real time optimized backup source. Therefore, it determines the local image of this file that is the source of real time optimized backup. It converts this call to a corresponding local name and again passes it to the file system to be reprocessed. This in turn opens the file A local version 2608 instead of the file A network version 2614. Accelerator redirector can be part of the file system request monitor or another kernel driver. It should trap all the file system requests to a network location and redirect it to an equivalent local call. Accelerator redirector knows to parse the file system monitor list. Therefore, it understands the source destination relationship. As an example, it will understands the information in file system monitor list 24 that "c:\source\sample folder" is to be backed of to "\\Backupserver\backupshare\userx\sample folder". As a corollary, "\\Backupserver\backupshare\userx\sample folder" is to be cached to "c:\source\sample folder". Therefore, any call to "\\Backupserver\backupshare\userx\sample folder\subdir\sample.doc." would be trapped by the accelerator driver and transmuted to a path "C:\source\sample folder\subdir\sample.doc". In Windows operating systems, to view these locations faster, use of an additional unit call network provider can be taken.

This technology has been described by "File System Request Redirection in a computer system", U.S. patent application Ser. No. 09/260,243, filed on Mar. 2, 1999, author Kiran Somalwar from Mobiliti, Inc., which is incorporated herein by reference. But there is a problem here. If the file A local version 2608 is modified, the file A local version and file A network version 2614 become out of sync. Real time optimized backup in accordance with embodiments of the present invention can be tracking the changes to the file A local version which will cause the file system monitor log 22 of FIG. 1 to be created by the file system request monitor 30. This in turn will trigger the synchronization process 18. Unfortunately, we won't be able to write to file A Network Version, as whenever we try to access it, the accelerator redirector 2609 traps the call and sends it back to file A local version. There can be two ways this problem can be solved.

In first method, there would be an intelligence in the accelerator redirector 2609 to let the calls go through the network for a file system call originating from the synchronization process 18 and redirect everything else.

Second method would be to make use of an additional module called synchronization server. Synchronization server process was described earlier as a helper process to enable synchronization process to transfer only portions in a file as opposed to transferring the whole file to keep the two files synchronized. The same synchronization process can be used for this additional task. FIG. 28 shows a diagram 2700 of a client computer 2702 in communication with a synchronization server computer 2710 through communications link 2710a. The client computer 2702 includes an application program 2704, a synchronization process 2703. The synchronization process 18 should have a direct link to Synchronization server process 2716 which should bypass the file system 28. The synchronization process can't access 2714 through the file system 28, as if it tries to do, it will get 2708 since client side acceleration is on. But if it communicates with the synchronization server process, synchronization server process accesses 2714 on behalf of synchronization process and sends the results back to synchronization process described by an internal protocol between synchronization process 2703 and synchronization server process 2716. The application program 2704 is electrically connected to the file system 2706 by communications link 2704a. The file A local version 2708 is electrically connected to the file system 2706 by communications link 2708a and to the accelerator redirector 2709 by communications link 2708b. The file system 2706 is electrically connected to the accelerator redirector 2709.

Synchronization server process resides in the destination file server or in a machine with a close proximity to the file server as described in FIG. 28. Therefore, whenever synchronization process tries to access the files belonging to the destination of Real Time Optimized Backup (e.g. FileANetworkVersion), it does not make a file system call. It sends a request to the synchronization server in a private protocol between synchronization process on client machine and the synchronization server process. Synchronization server process understands this request and does the file access to FileANetworkVersion on behalf of the client machine. The result is sent back to the client described in the private protocol. This method has lots of advantages. But one if the primary advantage which appears as a side effect is that the synchronization server and the client machine can build a protocol to transfer block level differencing, byte level differencing and compression. Therefore, in addition to providing client side caching, while doing Real Time Optimized Backup, we are only transferring only changed portions of the file to reflect the changes to the network destination as opposed to transferring the whole file.

The synchronization server computer 2710 includes a local area network (LAN) 2711 a file server A 2712, a file A network version 2714, and a synchronization server process 276. The LAN 2711 is electrically connected to the file server A by communications link 2711a. The file server A 2712 is electrically connected to the file A network version 2714 by communications link 2712a. The LAN 2711 is electrically connected to the synchronization server process 276 by communications link 2711a.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method of replicating one or more computer files comprising the steps of
   receiving a first file access request from a first application program wherein the first tile access request specifies a first file;
   determining if the first file is on a file system monitor list and if the first file is on the file system monitor list determining front the file system monitor list whether the first file is to be instantly replicated or lazily replicated;
   if the first file is to be lazily replicated lazily replicating the first file wherein the first file is lazily replicated by making a first entry in a file system monitor log and subsequently using the first entry in the file system monitor log to replicate the first file; and
   if the first file is to be instantly replicated instantly replicating the first file, wherein the first file is instantly replicated by replicating the first file without using the file system monitor log;
   and wherein
   if the first file is on the file system monitor list then determining if the first file access request is a close call; and
   if the first file access request is a close call and the first file is to be instantly replicated closing a first destination file corresponding to the first file; and
   if the first file access request is a close call end the first file is to be lazily replicated and the first file has been dirtied and newly created the first entry in the file system monitor log indicates that the first file is newly created; and
   if the first file access request is a close call and the first file is to be lazily replicated and the first file has been dirtied and is not newly created the first entry in the file system monitor log indicates that the first file has been modified.

2. A method of replicating one or more computer files comprising the steps of
   receiving a first fire access request from a first application program, wherein the first file access request specifies a first file;
   determining if the first file is on a file system monitor list, and if the first file is on the file system monitor list, determining from the file system monitor list whether the first file is to be instantly replicated or lazily replicated;
   if the first file is to be lazily replicated, lazily replicating the first file, wherein the first file is lazily replicated by making a first entry in a file system monitor log, and subsequently using the first entry in the file system monitor log to replicate the first file; and
   if the first file is to be instantly replicated, instantly replicating the first file, wherein the first file is instantly replicated by replicating the first file without using the file system monitor log;
   and wherein
   if the first file is on the file system monitor list then determining if the first file access request is a write call;
   if the first file access request is a write call and the first file is to be instantly replicated instantly replicating a plurality of writes for the first file to a first destination file; and
   if the first file access request is a write call and the first file is to be lazily replicated marking a current entry in a current active list that the first file has been dirtied.

3. The method of claim 2 wherein
   the first file is replicated by replicating changes to the first file to a backup file,
   wherein the backup file contains a previous version of the first file prior to the step of replicating changes.

4. The method of claim 2 wherein
   the step of lazily replicating the first fire includes waiting for a synchronization process to become active, wherein the synchronization process, when active, triggers the step of using the first entry in the file system monitor log to replicate the first file.

5. The method of claim 4 wherein
   the file access request does not cause the synchronization process to become active.

6. The method of claim 4 wherein
   the synchronization process becomes active after sleeping for a pre-defined interval.

7. The method of claim 4 wherein
   the file system monitor log is cleaned up after the synchronization process.

8. The method of claim 4 wherein
   the step of lazily replicating the first file includes creating the file system monitor log; and
   and wherein the synchronization process becomes active upon finding the file system monitor log.

9. The method of claim 2 further comprising
receiving a second file access request from a second application program, wherein the second file access request specifies a second file;
determining if the second file is on the file system monitor list;
if the second file is on the file system monitor list, determining from the file system monitor list whether the second file is to be instantly replicated or lazily replicated;
if the second file is to be lazily replicated, lazily replicating the second file, wherein the second file is lazily replicated by making a second entry in the file system monitor log, and subsequently using the second entry in the file system monitor log to replicate the second file; and
if the second file is to be instantly replicated, instantly replicating the second file, wherein the second file is instantly replicated by replicating the second file without using the file system monitor log; and
wherein if the first file and the second file are to be lazily replicated, the first entry and the second entry are in the file system monitor log at the same time.

10. The method of claim 2 wherein
the first entry in the file system monitor log indicates that the first file has been modified.

11. The method of claim 2 wherein
first entry in the file system monitor log indicates that the first file has been newly created.

12. The method of claim 2 wherein
the first entry in the file system monitor log indicates that the first file has been deleted.

13. The method claim 2 wherein
the first entry in the file system monitor log indicates that the first file has been renamed.

14. The method of claim 2 wherein
the first file access request is a file access request received by a computer operating system.

15. The method of claim 2 wherein
if the first file is not on the file system monitor list, the first file access request is not used to cause replication of the first file.

16. The method of claim 2 wherein
if the first file is on the file system monitor list, then determining if the first file access request is a create call; and
if the first file access request is a create call and the first file is to be instantly replicated, getting a first destination name for a first destination file corresponding to the first file and adding information concerning a first source name corresponding to the first file and adding the first destination name to a current active list along with information that the first file is to be instantly replicated.

17. The method of claim 2 further comprising
placing a first set of data for the first file on a current active list;
wherein the first set of data includes a flag to indicate whether instant replication or lazy replication is being used.

18. The method of claim 17 wherein
the first set of data includes a source file name and a destination file name for the first file.

19. The method of claim 17 wherein
the first set of data includes a flag to indicate whether the first file was dirtied since the first file was opened by the first file access request.

20. The method of claim 17 wherein
the first set of data includes a flag to indicate whether the first file is newly created.

21. A method of replicating one or more computer files comprising the steps of
receiving a first file access request from a first application program wherein the first file access request specifies a first file;
determining if the first file is on a file system monitor list and if the first file is on the file system monitor list, determining from the file system monitor list whether the first file is to be instantly replicated or lazily replicated;
if the first file is to be lazily replicated, lazily replicating the first file, wherein the first file is lazily replicated by making a first entry in a file system monitor log, and subsequently using the first entry in the file system monitor log to replicate the first file; and
if the first file is to be instantly replicated instantly replicating the first file wherein the first file is instantly replicated by replicating the first file without using the file system monitor log;
wherein
if the first file is on the file system monitor list, then determining if the first file access request is a rename call; and
if the first file access request is a rename call and the first file is to be instantly replicated, renaming a first destination file corresponding to the first file; and
if the first file access request is a rename call and the first file is to be lazily replicated, the first entry in the file system monitor log specifies that a rename should be performed on the first destination file and the first entry includes both an old name and a new name for the first destination file.

22. A method of replicating one or more computer files comprising the steps of
receiving a first file access request from a first application program, wherein the first file access request specifies a first file;
determining if the first file in on a file system monitor list and if the first file is on the file system monitor list determining from the file system monitor list whether the first file is to be instantly replicated or lazily replicated;
if the first file is to be lazily replicated lazily replicating the first file wherein the first file is lazily replicated by making a first entry in a file system monitor log, and subsequently using the first entry in the file system monitor log to replicate the first file; and
if the first file is to be instantly replicated instantly replicating the first file wherein the first file is instantly replicated by replicating the first file without using the file system monitor log;
wherein
if the first file is on the file system monitor list then determining if the first file access request is a delete call; and
if the first file access request is a delete call and the first file is to be instantly replicated deleting a first destination file corresponding to the first file; and
if the first file access request is a delete call and the first file is to be lazily replicated the first entry in the file system monitor log indicates that a deletion of the first destination file should be performed.

* * * * *